(12) United States Patent
Dziubinski et al.

(10) Patent No.: US 12,307,247 B1
(45) Date of Patent: May 20, 2025

(54) TRANSFORMER-BASED PROGRAMMING CODE VALUE QUANTIFICATION SYSTEM

(71) Applicants: Marek Dziubinski, Warsaw (PL); Tomasz Mularczyk, Warsaw (PL)

(72) Inventors: Marek Dziubinski, Warsaw (PL); Tomasz Mularczyk, Warsaw (PL)

( * ) Notice: Subject to any disclaimer, the term of this patent is extended or adjusted under 35 U.S.C. 154(b) by 0 days.

(21) Appl. No.: 18/884,687

(22) Filed: Sep. 13, 2024

Related U.S. Application Data

(60) Provisional application No. 63/548,912, filed on Feb. 2, 2024.

(51) Int. Cl.
  *G06F 8/77* (2018.01)
  *G06F 11/3604* (2025.01)
  *G06N 20/00* (2019.01)

(52) U.S. Cl.
  CPC ............ G06F 8/77 (2013.01); G06F 11/3616 (2013.01); G06N 20/00 (2019.01)

(58) Field of Classification Search
  CPC ........ G06F 8/77; G06F 11/3616; G06N 20/00
  USPC ......................................................... 717/102
  See application file for complete search history.

(56) References Cited

U.S. PATENT DOCUMENTS

| | | | | |
|---|---|---|---|---|
| 6,026,386 | A * | 2/2000 | Lannert | G09B 7/04 |
| | | | | 706/45 |
| 7,137,100 | B2 * | 11/2006 | Iborra | G06F 8/30 |
| | | | | 717/109 |
| 8,060,857 | B2 * | 11/2011 | Biggerstaff | G06F 8/76 |
| | | | | 717/136 |

(Continued)

FOREIGN PATENT DOCUMENTS

| | | |
|---|---|---|
| CN | 112417852 B | 1/2022 |
| CN | 115408056 A | 11/2022 |
| CN | 117270844 A | 12/2023 |

OTHER PUBLICATIONS

Shar, Lwin Khin, Lionel C. Briand, and Hee Beng Kuan Tan. "Web application vulnerability prediction using hybrid program analysis and machine learning." IEEE Transactions on dependable and secure computing 12.6 (2014): pp. 688-707. (Year: 2014).*

(Continued)

*Primary Examiner* — Satish Rampuria
(74) *Attorney, Agent, or Firm* — ArentFox Schiff LLP; Joseph M. Maraia

(57) ABSTRACT

Disclosed herein are computer-implemented systems and methods for code value assessment. For example, in one aspect, the system comprises, an input module configured to receive program code submissions from developers, a processing unit equipped with Text-Based Models with Contextual Understanding (TBM-CUs) configured to evaluate the functional meaning, purpose, and value of submitted code segments and distinguish between code contributions from human programmers and machine learning systems, a visualization module configured to present the assessed value of the analyzed code over various time periods and dimensions, offering insights into trends, patterns, and comparative performance, a communication module configured to translate programming code meaning or function into plain language summaries for non-technical stakeholders, and an AI peer review module configured to automatically review, accept or reject code contributions.

20 Claims, 11 Drawing Sheets

(56) References Cited

U.S. PATENT DOCUMENTS

| | | | | |
|---|---|---|---|---|
| 8,612,208 | B2* | 12/2013 | Cooper | G06F 16/3338 704/9 |
| 10,705,809 | B2* | 7/2020 | Makkar | G06F 8/71 |
| 11,429,352 | B2 | 8/2022 | Pujar et al. | |
| 2019/0303796 | A1* | 10/2019 | Balasubramanian | G06N 7/01 |

OTHER PUBLICATIONS

Xue, Hongfa, et al. "Machine learning-based analysis of program binaries: A comprehensive study." IEEE Access 7 (2019): pp. 65889-65912. (Year: 2019).*

Dehaerne, Enrique, et al. "Code generation using machine learning: A systematic review." Ieee Access 10 (2022): pp. 82434-82455. (Year: 2022).*

Allamanis, Miltiadis, et al. "A survey of machine learning for big code and naturalness." ACM Computing Surveys (CSUR) 51.4 (2018): pp. 1-37. (Year: 2018).*

Ango, "Supercharge productivity with generative AI and GitLab Duo," The Wayback Machine—https://web.archive.org/web/20240117165112/https://about.gitlab.com/blog/2023/07/20/supercharge-productivity-with-gitlab-duo/ pp. 1-13, 2023.

Guo et al., "Exploring the Potential of ChatGPT in Automated Code Refinement: An Empirical Study," ICSE 2024, pp. 1-13, 2024.

Yang et al., "A Survey on Detection of LLMs-Generated Content," Findings of the Association for Computation Linguistics: EMNLP 2024, pp. 1-20, 2023.

* cited by examiner

TRANSFORMER-BASED PROGRAMMING CODE VALUE QUANTIFICATION SYSTEM

CROSS REFERENCE TO RELATED APPLICATIONS

This Application claims benefit under 35 U.S.C. 119(e) to U.S. Provisional Patent Application No. 63/548,912, filed on Feb. 2, 2024, titled AI-ENHANCED PROGRAMMING CODE VALUE ASSESSMENT SYSTEM, the entirety of which is incorporated by reference herein.

FIELD OF TECHNOLOGY

Aspects of the present disclosure relate to technology in the field of software development and engineering, particularly focusing on innovative use of advanced Artificial Intelligence (AI) to automate the evaluation of source code and programmer performance. The technology of the present disclosure leverages Text-Based AI Models with Contextual Understanding to deliver comprehensive code analysis, enhance workforce management, and track productivity over time, addressing unique challenges in modern software engineering processes.

BACKGROUND

The field of software development has undergone significant evolution in its practices and methodologies, particularly in the areas of code review, quality assessment, workforce management, and productivity tracking. Examination of the historical progression of these practices in the context for the present technology clarifies the challenges that led to the need for more advanced solutions, such as the AI-driven solution of the present disclosure.

The field of artificial intelligence (AI) in software development has seen significant advancements, with numerous technologies aimed at enhancing various aspects of the development lifecycle. AI has been applied to tasks such as bug detection, security vulnerability analysis, code summarization, and code generation. However, existing solutions often focus on these specific aspects and do not provide comprehensive code value assessment or workforce management and productivity tracking.

Although, the known AI approaches do not focus on comprehensive code value assessment and workforce management, the scopes of some patents in AI, and how they differ from the method of the present disclosure are provided below.

CN117270844A discloses a code segment function description method based on tree-like neural network machine learning. This patent employs a multi-step process involving code preprocessing, abstract syntax tree (AST) extraction, and the application of a tree-based convolutional neural network (TBCNN) for embedding and feature extraction. The primary focus is on generating function descriptions from code segments using a neural network approach. Function descriptions are important for documentation, code maintenance, and understanding by providing concise explanations of what specific segments of code do. This helps developers quickly grasp the purpose and functionality of code, especially in large codebases or when collaborating in teams. This method enhances the generation of function descriptions and code reuse but does not address code value assessment, workforce management, or productivity tracking. The TBCNN used in this method is specifically designed to process tree structures like ASTs, focusing on the structural aspects of code. In contrast, the present technology utilizes Text-Based Models with Contextual Understanding (TBM-CUs) such as advanced versions of ChatGPT, Claude, Codex, and LLAMA. These TBM-CUs inherently possess the capability for semantic understanding and contextual analysis of code. They are leveraged in the present technology to provide comprehensive code value assessment for productivity tracking, and fully automated peer review processes, which are focused on evaluating and managing code quality and developer performance, rather than generating function descriptions as in CN117270844A. In summary, TBCNN from CN117270844A is used for generative purposes specifically, generating function descriptions while the technology of the present disclosure employs advanced TBM-CU for evaluative purposes.

CN115408056A presents a code abstract automatic generation method based on information retrieval and neural networks. The method aims to improve the accuracy and hit rate of low-frequency words in code abstract generation. This approach involves several steps: constructing a training set with source codes and natural language annotations, analyzing code segments into abstract syntax trees (ASTs), converting these trees into word sequences, encoding the source code into word-level vectors using a model like CodeBERT, and compressing these vectors into segment-level vectors. The method uses a combination of the structural information database and the semantic information database to find the most similar structural and semantic codes to generate a final abstract. While CodeBERT is a type of TBM-CU, in CN115408056A it is used for generative purposes-specifically, generating abstracts of code segments. This contrasts with the present technology, which employs advanced TBM-CUs for evaluative purposes. The present technology focuses on comprehensive code value assessment for productivity tracking, and fully automated peer review processes. These evaluative functions are designed to enhance workforce management and developer performance, offering a different application and set of functionalities compared to the generative focus of CN115408056A.

CN112417852B discloses a method and a device for judging the importance of a code segment. The method involves generating a target classification model through a preset classification model training process. Standardizing code annotation and maintaining appropriate levels of annotation helps in keeping the codebase well-documented, which is crucial for code readability, maintenance, and reducing technical debt. Accurate judgment of the importance of code segments ensures that critical parts of the code are well-annotated, aiding future development and debugging. When a code segment to be annotated is received, a first feature vector of the code segment is extracted and input into the target classification model, which outputs the importance judgment result of the code segment. This process aims to improve the standardization of code annotation and ensure that the amount of code annotation remains within an appropriate range. The classification model training process includes acquiring annotated code files, dividing these files into training code segments, setting labels for these segments, and training the initial classification model using feature vectors extracted from the code segments. The AI model used here generates importance judgments based on multiple feature vectors derived from code segments, including syntactic, text, structural, and relational features. The model considers various dimensions of the code to determine its importance accurately. This approach enhances the accuracy of determining the importance of code segments, which helps in improving the efficiency and quality of software development and maintenance. However, this method employs a pattern recognition technique rather than a context understanding advanced AI model. It focuses on identifying patterns and features within the code to judge its importance, without truly comprehending the code's functional or contextual significance. This approach fundamentally differs from Text-Based Models with Contextual Understanding (TBM-CUs), which go beyond pattern recognition and provide a deep comprehension of the code's semantic and contextual meaning. The present technology leverages TBM-CUs for comprehensive code value assessment for productivity tracking, and fully automated peer review processes. These evaluative functions are designed to enhance workforce management and developer performance, offering a different application and set of functionalities compared to the pattern recognition approach of CN112417852B, which is aimed at judging the importance of code segments. The TBM-CUs used in the technology of the present disclosure provides a context-aware evaluation of code, both numerical and categorical, enabling a thorough assessment of code quality, efficiency, and adherence to best practices, which is not addressed by the classification model in CN112417852B.

U.S. Ser. No. 11/429,352 focuses on building pre-trained contextual embeddings for programming languages using specialized vocabulary. This patent outlines a method that includes collecting programming code, preparing it to use a specialized vocabulary based on programming language keywords, and creating contextual embeddings for this code. Pre-trained contextual embeddings enhance the ability of models to understand and process programming languages effectively. Addressing the out-of-vocabulary (OOV) problem is crucial because it ensures that the model can handle and understand rare or previously unseen words, improving the accuracy and reliability of language models in various applications, such as code analysis and generation. The embeddings are stored as pre-trained contextual embeddings for use with pre-trained models, fine-tuning models, or machine learning models. The technique relies on natural language processing and machine learning to address the OOV problem and improve model training time and performance. Creating such embeddings is useful in Text-Based Models with Contextual Understanding, as it enhances their ability to understand and process programming languages effectively. However, while U.S. Ser. No. 11/429,352 emphasizes creating pre trained contextual embeddings and solving the OOV problem, it is not related to code value assessment which is the objective of the technology of the present disclosure.

The various technologies used in the above patents may also be reviewed historically. In order to add clarity, some of the historical context in the areas of code review, quality assessment, workforce management, and productivity tracking is first summarized below.

Historical Context of Code Review Processes: Code review, which involves the practice of systematically examining code changes before integration into a larger codebase, has been a fundamental part of software development since the 1970s. The evolution of code review practices can be summarized as follows:

Formal Inspections (1970s-1980s): Detailed, in-person reviews focused on finding defects, often involving lengthy meetings and paper-based code printouts.

Walkthrough Reviews (1980s-1990s): Less formal than inspections, but still conducted in person, allowing for more interactive discussions.

Tool-Assisted Reviews (1990s-2000s): Introduction of version control systems and diff tools to facilitate reviews, reducing the need for in-person meetings.

Modem Code Review (2000s-present): Lightweight, tool-based reviews integrated into the development workflow, often using platforms like GitHub or GitLab.

Despite these advancements, traditional code review processes continue to face challenges in consistency, objectivity, and scalability, especially in the context of large-scale or distributed development teams. Furthermore, the reliance on human reviewers can introduce delays, inconsistencies, and additional costs, highlighting the need for an automated, standardized peer review process and productivity tracking.

In conjunction with the code review processes, the application of computational techniques to code analysis has also progressed, though true semantic understanding remained elusive prior to the technology of the present disclosure. The evolution of the Code Analysis Tools can be summarized as follows:

1. Rule-Based Systems (1980s-1990s): Early attempts at automated code analysis used predefined rules to detect common errors and style violations.

2. Static Analysis Tools (1990s-2000s): More sophisticated tools emerged, capable of detecting potential bugs and security vulnerabilities through static code analysis. Examples include:
   a) SonarQube: Performs static code analysis to detect bugs, code smells, and security vulnerabilities.
   b) Coverity: Uses static analysis to identify defects and security issues in source code;

3. Style and Linting Tools (2000s-present):
   a) ESLint: Identifies and reports on patterns in JavaScript.
   b) Pylint: Checks for errors in Python code and enforces a coding standard.

4. Machine Learning Approaches (2010s): Introduction of probabilistic models and machine learning techniques to identify patterns in code and predict potential issues. Examples include:
   a) Kite: Uses machine learning for code completion suggestions.
   b) TabNine: Provides autocomplete suggestions based on statistical patterns in code.

5. Early attempts at semantic analysis (2015-present):
   a) DeepCode: Uses machine learning to find bugs, but still relies heavily on pattern matching rather than true semantic understanding.
   b) Facebook's Infer: Static analyzer that uses separation logic and bi-abduction to identify certain classes of bugs.

6. Code similarity detection:
   a) MOSS (Measure of Software Similarity): Used primarily for detecting plagiarism in programming assignments.

The above code analysis tools, while advanced for their time, primarily operated on syntactic analysis, pattern matching, and statistical methods. They lacked the deep semantic understanding and contextual awareness that the tool of the present technology provides.

In addition, with the rise of remote work and outsourcing in software development, the following new challenges in Remote/Outsourced Software Development Management have expanded:

Communication barriers and time zone differences that hinder seamless collaboration;

Difficulty in accurately assessing individual contributions and productivity in dispersed teams;

Challenges in maintaining consistent code quality across geographically distributed developers; and Promoting effective collaboration and knowledge sharing in virtual environments.

Monitoring and ensuring productivity in non-traditional work settings where oversight is limited.

These challenges have further heightened the need for objective, data-driven methods of evaluating code quality, developer performance, and productivity tracking.

In conventional approaches to evaluating programmer performance and productivity, traditional programming evaluation methods fall short because of the following:

Overemphasis on quantitative metrics (e.g., lines of code produced) that don't necessarily correlate with code quality or value;

Subjective assessments prone to personal bias and inconsistency;

Difficulty in comparing contributions across different projects or technologies;

Inability to account for the complexity and context of coding tasks;

Challenges in evaluating soft skills and collaborative contributions;

Lack of insight into actual productive coding time versus idle or non-coding activities; and Difficulty in assessing the true value and impact of code contributions to overall project goals.

The above limitations can lead to inaccurate performance and productivity assessments, affecting team morale, project outcomes, and strategic decision-making.

As mentioned above, the various technologies used in the patents describes above fail to provide a contextual understanding to deliver comprehensive code analysis, enhance workforce management, and track productivity over time. As such, there is a need to address the unique challenges in modem software engineering processes. The confluence of the above factors, including, such as, the evolving code review practices, limitations of existing code analysis tools, challenges in remote work management, and shortcomings of traditional evaluation methods, and the like, underscore the need for a more sophisticated approach to code review, programmer assessment, and productivity tracking.

SUMMARY

Aspects of the disclosure relate to use of advanced Artificial Intelligence (AI) to automate the evaluation of source code and programmer performance.

In one example aspect, a computer-implemented system for code value assessment is provided. The system comprises: an input module configured to receive program code submissions from one or more developers; a processing unit equipped with one or more Text-Based Models with Contextual Understanding (TBM-CUs), the processing unit configured to: evaluate the functional meaning, purpose, and value of submitted code segments, and distinguish between code contributions from human programmers and machine learning systems; a visualization module configured to present the assessed value of the analyzed code over various time periods and dimensions, offering insights into trends, patterns, and comparative performance; a communication module configured to translate programming code meaning or function into plain language summaries for non-technical stakeholders; and an AI (artificial intelligence) peer review module configured to automatically review, accept or reject code contributions.

In one example aspect, the TBM-CUs are configured to: apply a tokenization technique to segment the input code or text into a plurality of tokens, wherein said tokenization is executed at one or more granularity levels selected from the group comprising character-level, subword-level, word-level, and phrase-level; convert said tokens into numerical representations that encode the semantic and syntactic information of said tokens, enabling the TBM-CUs to process the input and identify relationships between different tokens; process the input sequentially, considering the order and dependencies between said tokens, and utilize mechanisms to capture and propagate contextual information across the input sequence, wherein said input sequences can have variable lengths; employ mechanisms based on mathematical operations, including matrix multiplications, vector additions, and non-linear transformations applied to the numerical representations of the tokens, to compute relevance scores or importance weights for different parts of the input; determine the contextual relationships within the input code or text by leveraging said sequential processing and relevance scores, enabling the TBM-CUs to identify long-range dependencies, establish connections between different parts of the input, and consider the overall context when generating output sequences; generate output sequences based on the input and learned patterns, wherein said output sequences can be of variable lengths; and adapt to process and analyze specific domains, including programming code or natural language text, by learning and capturing domain-specific patterns, structures, and semantics from relevant datasets to provide accurate analysis and interpretation within the given domain.

In one example aspect, the processing unit is configured to assess the value of the code submissions by: dividing the code submissions into a plurality of Functional Segments; for each Functional Segment, determining a Code Volume Measure that quantifies the amount of code in the Functional Segment, a Code Impact Multiplier that represents the influence of the Functional Segment on the overall project, a Code Quality Multiplier that reflects the adherence of the code within the Functional Segment to established programming best practices, and combining the Code Volume Measure, Code Impact Multiplier, and Code Quality Multiplier to generate a respective Code Value Indicator; aggregating the Code Value Indicators of all Functional Segments to determine the objective value of the code submission.

In one example aspect, the processing unit determines the Code Volume Measure for each Functional Segment by: converting each Functional Segment into a standardized programming language; reducing each converted Functional Segment to a minimal form; and measuring the volume of each reduced Functional Segment based on a combination of variables, logical operators, control flow statements, and function calls.

In one example aspect, the processing unit determines the Code Impact Multiplier for each Functional Segment by assessing the Functional Segment's influence on the overall project, taking into account factors including: Code Effectiveness; Code Complexity; Code Performance; Code Scalability; and Code Security.

In one example aspect, the processing unit calculates the Code Quality Multiplier for each Functional Segment by evaluating the Functional Segment's adherence to good programming practices, including: Code Readability and Documentation Quality; Adherence to Best Coding Practices; Code Testability; Error Handling; Code Redundancy; Code Bugginess; and Code Impact Potential.

In one example aspect, the processing unit is further configured to allow users to configure weights assigned to each evaluation category of the Code Quality Multiplier based on project needs or organizational priorities.

In one example aspect, the processing unit is further configured to calculate a Code Value Indicator for each Functional Segment by combining the Code Volume Measure, Code Impact Multiplier, and Code Quality Multiplier.

In one example aspect, the Code Value Indicator is calculated by multiplying the Code Volume Measure, Code Impact Multiplier, and Code Quality Multiplier.

In one example aspect, the Code Value Indicator provides a comprehensive numerical representation of the objective value of each Functional Segment, enabling meaningful comparisons between Functional Segments and tracking of productivity trends over time.

In one example aspect, the processing unit is further configured to measure code contributions over time by: tracking, for each Functional Segment of each developer, the Code Volume Measure, Code Impact Multiplier, and Code Quality Multiplier; aggregating the Code Volume Measure, Code Impact Multiplier, and Code Quality Multiplier over specified time periods; and providing insights into developer productivity trends based on the aggregated measures.

In one example aspect, the Processing Unit is further configured to: calculate an AI Tools Adoption Score for each developer, representing the extent to which the developer utilizes AI-assisted tools for documentation generation and code development.

In one example aspect, the system is further configured to: calculate the AI Tools Adoption Score for a human developer, wherein the calculation uses the Code Volume Measure as defined in claim 4. The AI Tools Adoption Score is calculated as an average of: an AI Documentation Generation Adoption sub-score, determined by the ratio of AI-generated comment characters to the total number of comment characters; and an AI Code Generation Adoption sub-score, determined by the ratio of the AI-generated Code Volume Measure to the total Code Volume Measure.

In one example aspect, the AI Tools Adoption Score for a fully autonomous AI developer is assigned a maximum value to differentiate its performance from that of human developers.

In one example aspect, the Processing Unit is further configured to assess a performance of the fully autonomous AI developer by: applying a same Code Volume Measure, Code Impact Multiplier, and Code Quality Multiplier evaluation process as used for human developers; comparing the AI developer's aggregated measures with those of the human developers; and providing insights into a relative performance and productivity of the AI developer compared to human developers.

In one example aspect, the AI Peer Review Module is further configured to: deploy a configurable set of domain-specific agents or modules, each incorporating knowledge and expertise from relevant domains, industries, or platforms using advanced natural language processing techniques and machine learning models; customize the domain-specific agents by training or enhancing them with relevant datasets, industry guidelines, and platform documentation to acquire specialized knowledge and expertise; dynamically select and apply the relevant domain-specific agents based on the project's configuration and the specific files or modules being reviewed, working in conjunction with the general code review capabilities of the AI Peer Review Module; ensure compliance with industry-specific requirements and project specifications; generate automated notifications based on predefined criteria; and produce automated documentation for certification and compliance purposes.

In one example aspect, the AI Peer Review Module is configured to generate notifications when: the code complexity exceeds a predefined threshold; critical issues are identified that may significantly impact the project; the developer's performance falls below their usual standards; the developer frequently introduces bugs in the same code segments; or potential malicious code patterns are detected.

In one example aspect, the Communication Module comprises an interactive interface that employs Text-Based Models with Contextual Understanding (TBM-CUs) to process inquiries from non-technical stakeholders, said TBM-CUs configured to: tokenize the inquiries to break them down into discrete units of meaning; perform syntactic parsing to analyze the grammatical structure of the inquiries; conduct semantic analysis to discern the contextual meaning and intent behind the inquiries; generate responses that are contextually relevant and semantically appropriate to the inquiries by leveraging the TBM-CUs' natural language generation capabilities; and tailor the generated responses to the specific needs and knowledge level of the non-technical stakeholders, ensuring effective and understandable communication.

In one example aspect, the Visualization Module is further configured to: provide comprehensive dashboards and detail-oriented views for technical users; generate simplified summaries for business users; and offer trend analysis, comparative views, and customizable reporting features.

In one example aspect, the processing unit is further configured to perform temporal analysis of the code submissions, comprising: evaluating the historical and future context of code changes; assessing the evolution of the code and identifying patterns; and predicting potential impacts of current changes on the project.

In one example aspect, the processing unit is further configured to: provide personalized evaluations and coaching for developers based on their code contributions by identifying strengths, areas for growth, and offering prescriptive guidance to improve future coding tasks; and leverage historical data of the code submissions and metrics of the performance to generate targeted feedback.

According to one example aspect of the disclosure, a computer-implemented method for code value assessment is provided, the method comprising: receiving program code submissions from one or more developers; evaluating the functional meaning and purpose of the submitted code segments by applying one or more Text-Based Models with Contextual Understanding (TBM-CUs); distinguishing between contributions from human programmers and machine learning systems using the TBM-CUs; presenting the assessed value of the analyzed code over various time periods and dimensions, offering insights into trends, patterns, and comparative performance using a Visualization Module; translating programming code meaning or function into plain language summaries for non-technical stakeholders using a Communication Module; and reviewing, accepting, or rejecting code contributions using an AI Peer Review Module.

In one example aspect, the evaluating the functional meaning and purpose of the submitted code segments comprises: dividing the code submissions into Functional Segments; for each Functional Segment, determining: a Code Volume Measure representing the objective amount of code in the Functional Segment, a Code Impact Multiplier representing the influence of the Functional Segment on the overall project, and a Code Quality Multiplier representing the Functional Segment's adherence to good programming practices; and combining the Code Volume Measures, Code Impact Multipliers, and Code Quality Multipliers of all Functional Segments to determine the overall value of the submitted code segment.

In one example aspect, determining the Code Volume Measure for each Functional Segment comprises: translating each Functional Segment into a common programming language; reducing each translated Functional Segment to a minimal form; and measuring the volume of each reduced Functional Segment based on a combination of variables, logical operators, control flow statements, and function calls.

In one example aspect, determining the Code Impact Multiplier for each Functional Segment comprises assessing the Functional Segment's influence on an overall project, considering factors including at least one or more of: Code Effectiveness, Code Complexity, Code Performance, Code Scalability, and Code Security.

In one example aspect, determining the Code Quality Multiplier for each Functional Segment comprises evaluating the Functional Segment's adherence to good programming practices, including Code Readability and Documentation Quality, Adherence to Best Coding Practices, Code Testability, Error Handling, Code Redundancy, Code Bugginess, and Code Impact Potential.

In one example aspect, the method further comprises: allowing users to configure weights assigned to each evaluation category of Code Quality Multiplier based on project needs or organizational priorities.

In one example aspect, the method further comprises: calculating a Code Value Indicator for each Functional Segment by combining the Code Volume Measure, Code Impact Multiplier, and Code Quality Multiplier.

In one example aspect, the method further comprises: measuring code contributions over time by: tracking the Code Volume Measures, Code Impact Multipliers, and Code Quality Multipliers of each developer's Functional Segments; aggregating the Code Volume Measures, Code Impact Multipliers, and Code Quality Multipliers over specified time periods; and providing insights into developer productivity trends based on the aggregated measures.

In one example aspect, the calculating the Code Value Indicator comprises multiplying the Code Volume Measure, Code Impact Multiplier, and Code Quality Multiplier.

In one example aspect, the Code Value Indicator provides a comprehensive numerical representation of an objective value of each Functional Segment, enabling meaningful comparisons among Functional Segments and tracking of productivity trends over time.

In one example aspect, the method further comprises: calculating the Code Value Indicator for each Functional Segment; aggregating the Code Value Indicators of all Functional Segments within a code submission to determine an overall Code Value Indicator for the submission; and using the overall Code Value Indicator to assess a total value of one or more codes submitted by a developer over a specified time period.

In one example aspect, the method further comprises: calculating an AI Tools Adoption Score for each developer, representing the extent to which the developer utilizes AI-assisted tools for documentation generation and code development.

In one example aspect, calculating the AI Tools Adoption Score for a human developer comprises: determining an AI Documentation Generation Adoption sub-score by calculating the ratio of AI-generated comment characters to the total number of comment characters; determining an AI Code Generation Adoption sub-score by calculating the ratio of the AI-generated Code Volume Measure to the total Code Volume Measure, wherein the determining the Code Volume Measure for each Functional Segment comprises: translating each Functional Segment into a common programming language, reducing each translated Functional Segment to a minimal form, and measuring the volume of each reduced Functional Segment based on a combination of variables, logical operators, control flow statements, and function calls; and calculating the AI Tools Adoption Score as an average of the AI Documentation Generation Adoption sub-score and the AI Code Generation Adoption sub-score.

In one example aspect, calculating the AI Tools Adoption Score for a fully autonomous AI developer comprises assigning a maximum value to distinguish its performance from that of human developers.

In one example aspect, the method further comprises: assessing the performance of the fully autonomous AI developer, wherein the assessing is performed by: applying the same Code Volume Measure, Code Impact Multiplier, and Code Quality Multiplier evaluation process as used for human developers; comparing the AI developers' aggregated measures to those of human developers; and providing insights into the relative performance and productivity of AI developers compared to human developers.

In one example aspect, the method further comprises: performing temporal analysis of the code submissions, wherein the temporal analysis includes: evaluating the historical and future context of code changes, assessing the evolution of the code and identifying patterns, and predicting potential impacts of current changes on the project.

In one example aspect, the method further comprises: providing personalized evaluations and coaching for developers based on their code contributions, identifying strengths, areas for growth, and prescriptive guidance.

According to one example aspect of the disclosure, the computer-implemented method for objective value and productivity assessment of independent developers and outsourcing companies using the AI-Enhanced Programming Code Value Assessment System, comprises: receiving code submissions from independent developers or outsourcing companies; evaluating the code submissions using the AI-Enhanced Programming Code Value Assessment System, to determine objective metrics for code quality, productivity, and overall value; generating a comprehensive assessment report that includes the objective metrics and comparative analysis against industry benchmarks; and providing the assessment report to the independent developers or outsourcing companies for use in marketing and justifying their rates to potential clients.

In one example aspect, the objective metrics include: Code Volume Measures, Code Impact Multipliers, Code Quality Multipliers, and measurements of productivity, wherein the determining the Code Volume Measure for each Functional Segment comprises: translating each Functional Segment into a common programming language, reducing each translated Functional Segment to a minimal form, and measuring the volume of each reduced Functional Segment based on a combination of variables, logical operators, control flow statements, and function calls; wherein determining the Code Impact Multiplier for each Functional Segment comprises assessing the Functional Segment's influence on an overall project, considering factors including at least one or more of: Code Effectiveness, Code Complexity, Code Performance, Code Scalability, and Code Security;

wherein determining the Code Quality Multiplier for each Functional Segment comprises evaluating the Functional Segment's adherence to good programming practices, including Code Readability and Documentation Quality, Adherence to Best Coding Practices, Code Testability, Error Handling, Code Redundancy, Code Bugginess, and Code Impact Potential; and wherein the measurements of productivity, includes measuring code contributions over time by: tracking the Code Volume Measures, Code Impact Multipliers, and Code Quality Multipliers of each developer's Functional Segments, aggregating the Code Volume Measures, Code Impact Multipliers, and Code Quality Multipliers over specified time periods, and providing insights into developer productivity trends based on the aggregated measures.

According to one example aspect of the disclosure, a computer-implemented system is provided for code value assessment, the system comprising: at least one memory; and at least one hardware processor coupled with the at least one memory and configured, individually or in combination, to perform: receiving program code submissions from one or more developers; evaluating the functional meaning and purpose of the submitted code segments by applying one or more Text-Based Models with Contextual Understanding (TBM-CUs); distinguishing between contributions from human programmers and machine learning systems using the TBM-CUs; presenting the assessed value of the analyzed code over various time periods and dimensions, offering insights into trends, patterns, and comparative performance using a Visualization Module; translating programming code meaning or function into plain language summaries for non-technical stakeholders using a Communication Module; and reviewing, accepting, or rejecting code contributions using an AI Peer Review Module.

In one example aspect, a non-transitory computer-readable medium is provided storing a set of instructions thereon for code value assessment, wherein the set of instructions comprises instructions for: receiving program code submissions from one or more developers; evaluating the functional meaning and purpose of the submitted code segments by applying one or more Text-Based Models with Contextual Understanding (TBM-CUs); distinguishing between contributions from human programmers and machine learning systems using the TBM-CUs; presenting the assessed value of the analyzed code over various time periods and dimensions, offering insights into trends, patterns, and comparative performance using a Visualization Module; translating programming code meaning or function into plain language summaries for non-technical stakeholders using a Communication Module; and reviewing, accepting, or rejecting code contributions using an AI Peer Review Module.

According to one example aspect of the disclosure, a computer-implemented system is provided for objective value and productivity assessment of independent developers and outsourcing companies using the AI-Enhanced Programming Code Value Assessment System, the system comprising: at least one memory; and at least one hardware processor coupled with the at least one memory and configured, individually or in combination, to perform: receiving code submissions from independent developers or outsourcing companies; evaluating the code submissions using the AI-Enhanced Programming Code Value Assessment System, to determine objective metrics for code quality, productivity, and overall value; generating a comprehensive assessment report that includes the objective metrics and comparative analysis against industry benchmarks; and providing the assessment report to the independent developers or outsourcing companies for use in marketing and justifying their rates to potential clients.

In one example aspect, a non-transitory computer-readable medium is provided storing a set of instructions thereon for objective value and productivity assessment of independent developers and outsourcing companies using the AI-Enhanced Programming Code Value Assessment System, wherein the set of instructions comprises instructions for: receiving code submissions from independent developers or outsourcing companies; evaluating the code submissions using the AI-Enhanced Programming Code Value Assessment System, to determine objective metrics for code quality, productivity, and overall value; generating a comprehensive assessment report that includes the objective metrics and comparative analysis against industry benchmarks; and providing the assessment report to the independent developers or outsourcing companies for use in marketing and justifying their rates to potential clients.

In one aspect, the system for improved code review and assessment would be capable of:

Understanding code semantics and intent across multiple programming languages;

Tracking programmer productivity over time to provide a comprehensive view of performance;

Delivering personalized recommendations and guidance to programmers for continuous skill improvement, identifying areas of strength and opportunities for growth;

Providing consistent, objective evaluations of code quality and value;

Offering context-aware feedback comparable to experienced human reviewers;

Scaling to handle large codebases and distributed development teams;

Integrating with existing development workflows and tools;

Supporting fair and comprehensive programmer performance evaluation;

Differentiating between substantive code contributions and superficial changes;

Assessing actual productive coding time and efficiency;

Evaluating the alignment of code contributions with project goals and requirements;

Providing insights into team collaboration and knowledge sharing;

Identifying patterns in code evolution that indicate maturity and stability; and Offering predictive analysis on the potential impact of code changes.

The AI-driven object code review assessment of the present disclosure addresses many of the challenges faced in modern software development, particularly in the context of remote and outsourced work environments. It provides a foundation for more effective code review processes, more accurate programmer evaluations, enhanced productivity assessments over time, and ultimately, improved software quality and development team management.

Thus, the method and system of the present disclosure address these needs through the application of advanced AI techniques, specifically Text-Based AI Models with Contextual Understanding (TBM-CUs), to the tasks of code review, quality assessment, programmer evaluation, and productivity analysis. Unlike previous approaches, the technology of the present disclosure offers true semantic understanding of code, enabling a level of analysis and insight previously unattainable in automated code review and developer assessment systems.

The technology of the present disclosure employs advanced Text-Based AI Models with Contextual Understanding (TBM-CUs), such as advanced versions of ChatGPT, Claude, Codex, LLAMA and others, to enhance the evaluation of programming code segments and improve workforce management and productivity tracking in software development. These TBM-CUs demonstrate semantic understanding of code, interpreting functional meaning and intent across multiple programming languages. Unlike traditional static analysis tools, these models can distinguish between substantive code changes and superficial alterations like variable renaming or code reformatting. The invented system assesses code value both numerically and categorically, considering factors including algorithmic efficiency, scalability, and adherence to best practices.

Key Features of the Technology Include:

1. The use of advanced Text-Based AI Models with Contextual Understanding for code value assessment and productivity tracking, providing objective evaluations of developer contributions and performance across in-house, remote, and outsourced environments.

2. Comprehensive code evaluation scores that incorporate both numerical and categorical assessments, considering factors such as algorithmic efficiency, scalability, and adherence to best practices.

3. Full automation of the peer code review process using TBM-CUs, providing context-aware feedback, approving code changes, and ensuring standardization and adherence to best practices and legal or compliance requirements.

4. Generation of plain language summaries, describing code purpose and value for non-technical stakeholders.

5. Differentiation between human-written and AI-generated code, to promote the use of AI tools for increased efficiency and ensure accurate valuation of contributions.

By utilizing TBM-CUs that comprehend code beyond surface-level analysis, this system aims to provide an objective means to assess code value, support developer productivity, and enhance software development processes. It addresses challenges in managing distributed teams and provides data-driven insights for Human Resource (HR) decision-making, including performance evaluation, and skill development based on coding proficiency and productivity metrics.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations. The foregoing and other objects, features, and advantages will be apparent from the following more detailed description of exemplary aspects, as illustrated in the accompanying drawings. In the drawings, like reference characters generally refer to the same parts throughout the different views. The drawings are provided for illustrative purposes and are not necessarily to scale, with emphasis instead placed on illustrating the principles of the various aspects.

DETAILED DESCRIPTION

Figure 1:
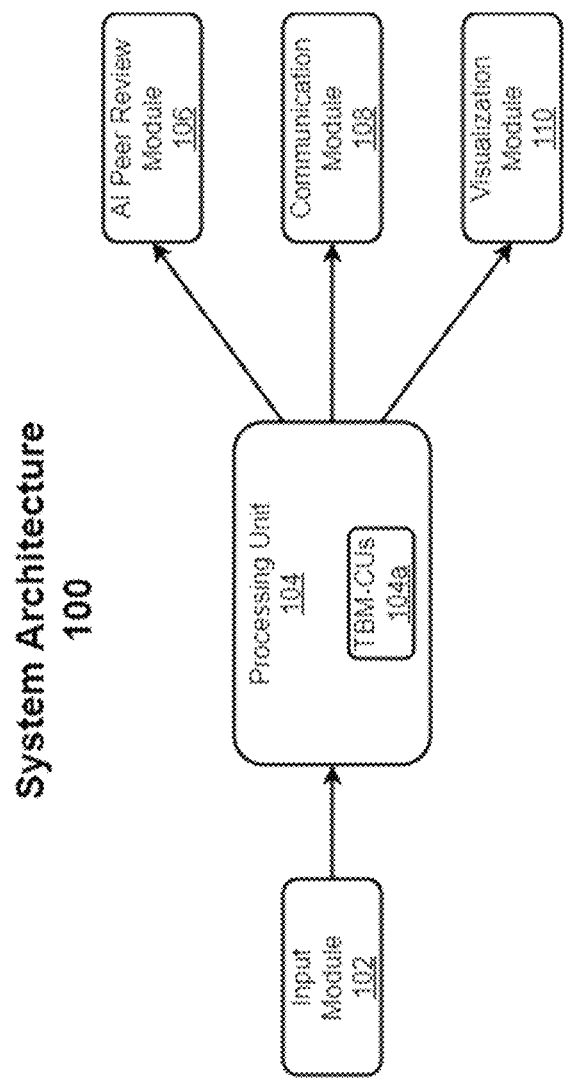
FIG. 1 illustrates a high-level diagram of the AI-Enhanced Programming Code Value Assessment System in accordance with aspects of the present disclosure.

Example aspects are described herein in the context of an apparatus, system, method, and various computer program features for AI-Enhanced Programming Code Value Assessment System that utilizes advanced Text-Based AI Models with Contextual Understanding (TBM-CUs) to revolutionize the evaluation of code, workforce management, and productivity tracking within software development environments. This system integrates seamlessly with existing development workflows and tools, providing real-time insights and recommendations to improve code quality, enhance efficiency, and foster collaboration.

Core Technology: At the heart of the system are sophisticated TBM-CUs, including advanced iterations of models such as ChatGPT, Claude, Codex, and LLAMA. These models demonstrate an exceptional capability to grasp semantic meanings and contextual nuances of various programming languages. They excel in analyzing code beyond mere syntactic recognition, enabling the discernment of functional intent and logical flow within code segments. Such capabilities position TBM-CUs as invaluable assets in assessing code value and automating peer review processes.

Code Value assessments: The system conducts exhaustive assessments of code segments by applying a broad spectrum of numerical and categorical criteria. These criteria cover essential factors including, but not limited to, algorithmic efficiency, scalability, adherence to best practices, and alignment with overarching project objectives. Furthermore, the system is adept at distinguishing between human-authored and AI-generated code, ensuring precise attribution and equitable valuation of developer contributions.

Automated Peer Code Review: A standout feature of the system is its automated peer code review functionality, which exploits the contextual understanding capabilities of TBM-CUs. This feature automates the provision of context-aware feedback on code modifications, identifies potential issues, and suggests actionable improvements, thereby streamlining the review process and reducing the dependency on human reviewers. The system can autonomously approve code changes that satisfy predefined quality thresholds, thus ensuring consistent adherence to best practices and upholding superior code quality standards.

Communication Enhancement: To bridge communication gaps between technical and non-technical stakeholders, the system generates succinct plain language summaries that articulate the purpose and value of code segments. These summaries elucidate the contributions of specific code segments to project objectives, thereby aiding effective communication and decision-making processes. By providing a lucid overview of the codebase, the system bolsters collaboration and alignment among team members.

Productivity Tracking and Workforce Management: In addition to code evaluation, the system offers robust productivity tracking and workforce management functionalities. It meticulously analyzes developer activities, capturing metrics such as code contributions, time spent on coding tasks, and patterns of collaboration. Armed with objective, data-driven insights into individual and team performance, the system equips project managers and HR professionals with the tools necessary to make informed decisions. These tools enable the identification of top performers, effective resource allocation, and the provision of targeted training and support, all of which are geared towards optimizing team productivity and fostering skill development.

System Integration and Scalability: Designed for seamless integration with popular development platforms and tools, the system enables developers to receive real-time feedback and recommendations directly within their coding environment. Its scalable architecture ensures efficient handling of large codebases and accommodates distributed development teams with ease. The system supports flexible deployment options, including cloud-based and on-premise installations, catering to the varied needs of diverse organizational landscapes.

Innovative Productivity Metrics: By harnessing the power of advanced TBM-CUs, the system introduces unprecedented levels of insight, automation, and objectivity to the software development process. It empowers organizations to optimize code quality, enhance developer productivity, and make data-driven decisions for effective workforce management. With comprehensive capabilities for code analysis, automated peer reviews, and productivity tracking, the AI-Enhanced Programming Code Value Assessment System stands as a pioneering solution for advancing software engineering practices and achieving project success.

Text-Based AI Models with Contextual Understanding (TBM-CUs): At the core of the AI-Enhanced Programming Code Value Assessment System are the advanced Text-Based AI Models with Contextual Understanding (TBM-CUs). These models are designed to process, understand, and analyze code semantics, context, and intent across multiple programming languages. TBM-CUs are not limited to a specific architecture or technology, but rather encompass a broad range of current and future text-based AI models that exhibit contextual understanding capabilities.

TBM-CUs are trained on vast amounts of code and natural language data, enabling them to learn the intricacies of programming languages, software development best practices, and domain-specific knowledge. The training process involves exposing the models to a diverse set of code snippets, documentation, comments, and associated metadata, allowing them to capture the relationships between code elements, their functionality, and their intended purpose.

One of the key characteristics of TBM-CUs is their ability to understand and process code at a semantic level, beyond simple syntactic analysis. They achieve this through the use of advanced natural language processing (NLP) techniques, such as tokenization, parsing, and named entity recognition. These techniques allow the models to break down code into meaningful units, identify programming constructs, and extract relevant information from comments and documentation.

TBM-CUs employ various neural network architectures to capture the complex relationships and dependencies within code. These architectures may include recurrent neural networks (RNNs), long short-term memory (LSTM) networks, transformers, graph neural networks (GNNs), or other emerging architectures that excel at processing sequential and structured data. The choice of architecture depends on the specific requirements of the system and the advancements in AI research.

One of the critical components of TBM-CUs is their attention mechanism, which allows the models to focus on relevant parts of the code and contextual information when making assessments. Attention mechanisms enable the models to weigh the importance of different code elements, comments, and documentation based on their relevance to the task at hand. This capability is particularly useful for understanding the impact and quality of code changes, as it helps the models identify the most significant aspects of the code that contribute to its overall value.

TBM-CUs also incorporate techniques for handling code-specific challenges, such as variable naming conventions, code obfuscation, and the presence of non-English words or domain-specific jargon. They employ techniques like sub-word tokenization, byte-pair encoding (BPE), or wordpiece models to break down words into meaningful subunits, enabling the models to handle out-of-vocabulary words and adapt to the unique characteristics of different programming languages.

Another essential aspect of TBM-CUs is their ability to capture and utilize contextual information. They consider the surrounding code, the project's overall structure, and the historical context of code changes to provide a more comprehensive understanding of the code's purpose and impact. TBM-CUs analyze code changes not only in isolation but also in relation to previous versions of the code, allowing them to identify the evolution of code over time and assess the cumulative impact of changes.

To enable efficient processing of large codebases and handle the memory limitations of AI models, TBM-CUs employ techniques such as code segmentation, hierarchical processing, and sparse attention. Code segmentation involves breaking down the codebase into smaller, manageable units, while hierarchical processing allows the models to analyze code at different levels of granularity, from individual code segments to the entire project. Sparse attention mechanisms help the models focus on the most relevant parts of the code, reducing computational overhead and improving scalability.

TBM-CUs are continuously updated and refined based on the latest advancements in AI research and the evolving needs of software development. As new architectures, training techniques, and optimization methods emerge, the models are adapted to incorporate these improvements. This ensures that the AI-Enhanced Programming Code Value Assessment System remains at the forefront of AI-driven code analysis and evaluation.

The versatility and adaptability of TBM-CUs make them suitable for a wide range of programming languages, development methodologies, and project domains. Whether it's analyzing code written in popular languages like Python, Java, or C++, or assessing code in emerging paradigms like functional programming or domain-specific languages, TBM-CUs can be trained and fine-tuned to provide accurate and insightful evaluations.

In summary, Text-Based AI Models with Contextual Understanding (TBM-CUs) are the driving force behind the AI-Enhanced Programming Code Value Assessment System. These advanced models leverage state-of-the-art NLP techniques, neural network architectures, and attention mechanisms to comprehend code semantics, context, and intent. By continuously evolving and adapting to new technologies and research findings, TBM-CUs ensure that the system remains a powerful and reliable tool for automating code evaluation, improving developer productivity, and driving software development excellence.

Functional Code Segmentation: The present technology introduces a novel approach to code segmentation for the purpose of calculating various scores and metrics. The segmentation process divides the code into Functional Segments, which serve as the basic units for calculations, including Volume, Impact, Quality, and their respective sub-scores. These Functional Segments are also utilized as the foundation for productivity calculations, enabling the analysis of score values over time through trends, graphs, reports, and statistical analyses. The rationale behind this segmentation approach is to provide an objective and consistent division of the code, independent of the frequency or size of code commits. By relying on Functional Segments rather than commits, the technology ensures that the analysis is based on meaningful and coherent units of code, regardless of whether the commits are small and frequent or large and infrequent. This approach allows for a more accurate representation of the code's functionality and the developer's contributions over time.

To achieve this functional code segmentation, the technology employs Text-Based AI Contextual Understanding (TBM-CUs). These models are trained to recognize logical boundaries within the code, such as function definitions, class definitions, or significant blocks of code that perform specific tasks. The TBM-CUs analyze the committed code and identify distinct Functional Segments or modules based on these logical boundaries.

The segmentation process aims to break down the code into meaningful and coherent units, allowing the TBM-CUs to identify not only traditional boundaries like functions or classes but also logical units of work that might not be structurally obvious. This comprehensive approach ensures that the segmentation captures the true essence of the code's functionality and the developer's contributions.

Each identified segment is treated as a separate unit for measurements, score calculations, statistical analyses, and reports. By operating on these Functional Segments, the technology provides a consistent and objective foundation for evaluating code value, developer productivity, and project progress.

The Code Volume is a fundamental measure used for code value representation, designed to provide an objective assessment of the amount of code created, regardless of the programming style or language. The technology achieves this by utilizing Text-Based AI Models with Contextual Understanding (TBM-CUs) in a three-step process:

Step 1: Translation to Common Code Representation The code segment is translated into a common programming language, such as Python, machine code, or other representation, while preserving the structure and logic of the original code.

Step 2: Reduction to Minimal Code Volume Representation The TBM-CU analyzes each code segment and reduces it to its minimal form, eliminating redundant or unnecessary elements while preserving the core functionality.

Step 3: Code Volume Measure The technology measures the volume of the translated and reduced code segment by counting the following elements:
Variables,
Logical Operators,
Control Flow Statements, and
Function Calls.

In addition to the basic Code Volume Measure, the technology introduces an Effective Code Volume Measure, which takes into account redundant code fragments and promotes the use of well-known libraries. This measure is used for calculating the Code Value Indicator (CVI) and the Code Quality Score.

By following these steps, the Code Volume Measurement provides an accurate and objective assessment of the amount of code created by the developer.

The Code Impact assessment is designed to accurately evaluate advanced code contributions that exert a significant influence on the overall project, regardless of their volumetric size. This assessment acknowledges that code segments may introduce innovations, address critical areas such as data security, or incorporate optimizations that substantially benefit the project. Accordingly, the Code Impact is applied as a multiplier (CIM—which is always greater than or equal to one) to the volume, effectively emphasizing the significance of high-impact code in the overall Code Value calculation.

The technology quantifies the Code Impact of each code segment by assigning points within the following categories:
Code Effectiveness,
Code Complexity,
Code Performance,
Code Scalability, and
Code Security.

The derived Code Impact from the assessments is converted into a multiplier value (CIM), which is utilized alongside the Volume Measurement to ascertain the comprehensive Code Value. By employing TBM-CUs for precise segmentation and impact scoring, the system ensures an accurate reflection of the varying degrees of impact across individual contributions or over time, thereby facilitating a nuanced evaluation of each code segment's overall value and its contribution to productivity metrics.

The Code Quality represents adherence to good programming practices, which are relevant for ease of readability, reusability, testability, error handling, efficient code organization, and the appropriate use of advanced techniques impacting the efficiency or safety of the project. If not maximized, the Code Quality will have a negative impact on the Code Value Indicator (CVI), decreasing it to reflect the reduced value caused by improper coding practices. Code Quality is composed of the following sub-scores:
Code Readability and Documentation Quality,
Adherence to Best Coding Practices,
Code Testability,
Error Handling,
Code Redundancy,
Code Bugginess, and
Code Impact Potential.

The Code Quality Multiplier is represented as a weighted average of the sub-scores, with weights assigned to each sub-score based on their importance and impact on the overall code quality. These weights can be further fine-tuned based on specific project requirements, team priorities, and industry standards. By utilizing TBM-CUs to measure Code Quality per segment, the technology accurately reflects the varying degrees of quality within a single commit or across a defined period. This method facilitates a nuanced and precise evaluation of the code's quality, enhancing the understanding of its overall value and contributions to productivity metrics.

The Code Value Indicator (CVI) is a comprehensive metric that quantifies the value of each code segment by combining three essential aspects: Code Volume, Code Impact, and Code Quality. This indicator enables a precise and comparative assessment of Code Value, facilitating meaningful distinctions between code segments.

The CVI provides a definitive numerical representation for each code segment, allowing for effective comparisons between segments that may have similar volumes but differ in impact, or quality. Furthermore, the CVI serves as a measure of productivity over time, enabling the tracking and evaluation of productivity trends, which aids in identifying patterns and potential areas for improvement.

By providing an objective and actionable metric, the CVI enhances project management and informs strategic decision-making for optimal resource utilization and project advancement.

Productivity (P): The present technology provides a comprehensive system for productivity tracking by generating productivity representations per commit or per period. These representations include:
  Code Value/period: Sum of CVI values of code segments over a given period,
  Code Volume/period: Sum of Effective Code Volume values of code segments over a given period,
  Code Impact/period: Sum of Code Impact values of code segments over a given period, and
  Code Quality/period: Average of all Code Quality Scores of code segments over a given period.

The system aggregates various measures for the given commit or over a given period of time for the following productivity (P) categories:
  $P_{vol}$: Sum of Effective Volume measures over a given period;
  $P_{impact}$: p measures over a given period weighted by Effective Volume;
  $P_{quality}$: Average of the Code Quality measures over a given period weighted by Effective Volume; and
  $P_{value}$: Sum of the CVI values for a given period.

The technology employs normalization and comparison techniques, leveraging its extensive database to provide contextual insights into developer productivity. These comparisons are performed at multiple levels, including individual developer's current productivity vs past productivity, team-level comparison, company-level comparison, and regional comparison.

The visualizations and reports generated by the system present the productivity metrics in a clear and accessible format, enabling stakeholders at all levels to understand and interpret the data easily.

The AI Tools Adoption Score is a crucial metric designed to assess the extent to which human developers utilize AI-assisted tools for documentation generation and code development. This score, calculated per individual code segment, provides valuable insights into the effectiveness and impact of AI tools on various aspects of the development process, including productivity, code quality, and overall project value.

As AI-based systems are becoming more prevalent and work alongside human developers on project tasks, the AI Tools Adoption Score will play a vital role in optimizing the management of these resources. By tracking the correlation between AI tool adoption and key measures such as Code Volume, Code Impact, and Code Quality, project managers can make informed decisions on task allocation, ensuring the best use of human developers and AI-based systems to maximize cost-efficiency and project value.

For human developers, the AI Tools Adoption Score is calculated as the average of two sub-scores: AI Adoption in Documentation and AI Adoption in Coding. For fully autonomous AI-based systems (i.e. AI Developers), the AI Tools Adoption Score is set to maximum value in the user settings within the invented system, clearly distinguishing between human and AI programmers.

The AI Tools Adoption Score can be utilized in reporting, statistical analysis, and visualizations to provide stakeholders with a clear understanding of the AI transformation process and the comparative performance of human and AI developers. By leveraging this score, project managers can optimize resource allocation, maximize the value of AI tools, and drive continuous improvement in development processes.

The AI Peer Review Module is an integral component of the AI-Enhanced Programming Code Value Assessment System. Its primary function is to provide automated, consistent, and comprehensive code reviews, ensuring that the submitted code meets the required quality standards, adheres to best practices, and complies with project specifications and relevant regulations. The module leverages the capabilities of Text-Based AI Models with Contextual Understanding (TBM-CUs) to analyze code segments and provide meaningful feedback to programmers.

Key features and functionalities of the AI Peer Review Module include:
  1. Quality Metrics Feedback: The module provides structured feedback in the form of comments, utilizing the Code Quality Metrics defined in the system.
  2. Volume Measure Feedback: The module offers feedback derived from the Volume Measure calculations, identifying instances where the volume is not accounted for due to improper coding practices, lack of code reuse, or the introduction of bugs.
  3. Impact Measure Feedback: Impact Measure calculations may be used for providing feedback, depending on the nature of the tasks assigned to the developer.
  4. Documentation and Rationale: The module produces and stores documentation for each commit, detailing the rationale behind measure calculations, commit rejection, or acceptance.
  5. Compliance with Required Standards: The generated documentation adheres to the required standards, such as SOC2 Type 2, to automate the documentation process and ensure compliance.
  6. Project Configuration: The module relies on a customizable Project Configuration that holds all necessary information, including project specifications, documentation, expected quality standards, company practices, compliance regulations, and licensing details.
  7. Code Review Outcomes: The module determines code review outcomes based on predefined criteria, including automatic approval, revision and resubmission, critical issue flagging, and feedback provisioning.
  8. Manual Review Escalation and Notification: In certain cases, the module may escalate the code review to a manual process involving senior developers, technical leads, or subject matter experts who can provide additional insights and guidance.

By implementing these comprehensive rules and functionalities, the AI Peer Review Module offers an automated, consistent, and educational code review process that maintains high quality standards, promotes continuous improvement, and drives code quality, productivity, and workforce management.

The Communication Module of the invented system is integral for translating complex code analyses into summaries that are comprehensible for both technical developers and non-technical stakeholders. This module leverages the use of TBM-CUs to automate the creation of these summaries.

Functionality and Operation: The module operates by extracting essential information from the system's evaluations of developer performance or code functionality, impact, quality and value. It processes this information into summaries tailored to the expertise level of various stakeholders. For example, summaries for project managers focus on project alignment and impact metrics, while those for business stakeholders emphasize enhancements in product functionality and user experience.

Integrated within the system is an interactive dashboard that displays these summaries along with the charts and graphs. This dashboard updates in real time and provides both comprehensive views and detailed drill-down options, enabling informed decision-making across various project levels.

Interactive Prompting Feature: Further enhancing its functionality, the Communication Module includes an interactive prompting feature. This feature provides a chat-like interface within the dashboard, allowing users to interact directly with the Text-Based AI Models with Contextual Understanding (TBM-CUs).

Capabilities of the Interactive Prompting Feature:
- Real-Time Dialogue: Users can pose questions directly to the TBM-CUs and receive instant, context-aware responses. This interaction allows stakeholders to gain deeper insights into the code's impact, functionality, and the rationale behind specific evaluations.
- Context-Aware Responses: Utilizing the context of the entire project, the TBM-CUs offer responses that are precise and relevant to the current stage of the project and the specific concerns of the user, thus ensuring that communications are both accurate and highly pertinent.
- Plain Language Processing: The TBM-CUs are equipped to articulate responses in plain language, making technical information accessible and understandable to non-technical stakeholders, thus bridging communication gaps within project teams.

Strategic Advantages:
- The implementation of this feature ensures that all team members, regardless of their technical expertise, are kept informed and able to actively participate in project discussions and decisions.
- By promoting transparency and fostering an environment of informed collaboration, the module supports trust and effective teamwork across departments.
- Ensuring that technical progress aligns with business goals aids efficient project management and optimal resource utilization.

By integrating this interactive prompting feature into the Communication Module, the system not only simplifies the interpretation of complex technical data but also engages stakeholders directly, enhancing overall project communication and success.

Integration with Development Workflows and Tools: The AI-Enhanced Programming Code Value Assessment System is designed to seamlessly integrate with existing development workflows and tools, ensuring a smooth adoption process and minimal disruption to established processes. This integration allows developers to leverage the system's capabilities within their familiar development environment, enhancing productivity and collaboration.

The system integrates with popular version control systems and code repositories, such as Git, GitHub, GitLab, and Bitbucket. When developers commit their code changes to these repositories, the system automatically analyzes the submitted code using the advanced Text-Based AI Models with Contextual Understanding (TBM-CUs). This integration enables real-time code evaluation, providing developers with immediate feedback on code quality, adherence to best practices, and potential areas for improvement.

To facilitate this integration, the system utilizes the APIs provided by these version control platforms. It executes structured API calls, such as RESTful HTTP requests, to access the necessary code and metadata from the repositories. The system retrieves information such as the timestamp of the submission, author's identity, commit messages, and the history of changes (diff). This data is then processed by the TBM-CUs to perform a comprehensive analysis of the code, taking into account the context and the developer's past contributions.

The system also integrates with popular Integrated Development Environments (IDEs) and code editors, such as Visual Studio Code, IntelliJ IDEA, Eclipse, and Sublime Text. Through the use of plugins or extensions, developers can access the system's features directly within their coding environment. These plugins enable developers to receive real-time feedback, suggestions, and alerts based on the system's analysis of their code. This integration streamlines the development process by providing developers with contextual insights and recommendations without the need to switch between different tools.

In addition to the real-time feedback, the system generates comprehensive reports and visualizations that can be accessed through a web-based dashboard. This dashboard integrates with project management tools, such as Jira, Trello, or Asana, allowing project managers and team leaders to track progress, identify bottlenecks, and make data-driven decisions. The integration with these tools enables the synchronization of project tasks, milestones, and deadlines, ensuring that the insights provided by the system are aligned with the overall project goals and timelines.

The system's integration capabilities extend to continuous integration and continuous deployment (CI/CD) pipelines, such as Jenkins, Travis CI, or CircleCI. By incorporating the AI-Enhanced Programming Code Value Assessment System into these pipelines, organizations can enforce code quality gates and automate the code review process. The system can be configured to automatically approve or reject code changes based on predefined quality thresholds, ensuring that only high-quality code progresses through the pipeline. This integration helps maintain a consistent level of code quality across the entire development lifecycle.

To support collaboration and knowledge sharing, the system integrates with communication and documentation platforms, such as Slack, Microsoft Teams, or Confluence. Developers can receive notifications, participate in discussions, and access system-generated reports and documentation directly within these platforms. This integration fosters a collaborative environment where developers can share insights, discuss best practices, and learn from each other's experiences.

The AI-Enhanced Programming Code Value Assessment System also provides a comprehensive API that allows organizations to integrate the system with their existing tools and workflows. The API enables developers to programmatically access the system's features, such as triggering code evaluations, retrieving analysis results, and automating workflows. This flexibility allows organizations to customize the integration based on their specific needs and existing infrastructure.

By seamlessly integrating with the development workflows and tools that developers already use, the AI-Enhanced Programming Code Value Assessment System minimizes adoption barriers and maximizes its impact on code quality, developer productivity, and overall project success. The system's integration capabilities ensure that the insights and recommendations provided by the advanced TBM-CUs are easily accessible and actionable, empowering developers and organizations to continuously improve their software development processes.

In order to clarify the implementation of the present disclosure, exemplary aspects are described below:

Example One

In example one, a detailed Code Volume measurement process is described. The AI-Enhanced Programming Code Value Assessment System employs a comprehensive process for measuring the Code Volume, which serves as a fundamental metric for objectively assessing the quantity of code generated, irrespective of programming style or language. The process leverages Text-Based AI Models with Contextual Understanding (TBM-CUs) and consists of the following three main steps:

Step 1: Translation to Common Code Representation The code segment is translated into Python. This translation aims to preserve the structural and logical integrity of the original code while complying with the syntax of the selected language. During this process, language-specific constructs and libraries are handled by identifying their closest equivalents or providing appropriate abstractions. This step ensures that the code can be effectively analyzed and measured regardless of its original programming language.

Step 2: Reduction to Minimal Code Volume Representation The TBM-CU analyzes each translated code segment and reduces it to its minimal form. This reduction process involves eliminating redundant or superfluous elements while retaining the essential functionality of the code. The resulting minimal form contains only the necessary operations, control structures, and data manipulations required to achieve the desired functionality. By reducing the code to its minimal form, the system can accurately measure the true volume of code created by the developer.

Step 3: Code Volume Measure Once the code segment is translated and reduced to its minimal form, the system measures its volume by tallying the following elements:
1. Variables: The count of unique variables employed within the code segment.
   Logical Operators: The tally of logical operators used, including arithmetic operators (e.g., +, −, *, /, %), comparison operators (e.g., =, !=, C, >, <=, >=), and logical operators (e.g., and, or, not).
2. Control Flow Statements: The count of control flow statements utilized, such as conditional statements (e.g., if, elif, else), loops (e.g., for, while), and branching statements (e.g., break, continue, return).
3. Function Calls: The number of function calls made within the code segment, including calls to user-defined functions and those involving external libraries or the existing codebase.

Effective Code Volume Measure In addition to the basic Code Volume Measure, the technology introduces an Effective Code Volume Measure, which is employed for reporting, visualizations, and quality score calculations.

This measure incorporates the following considerations:
1. Redundant Code Fragments:
   a) The system identifies code fragments that are repeated within the code segment or in previously committed code segments, adhering to the DRY (Don't Repeat Yourself) principle.
   b) Each occurrence of a redundant code fragment is treated as a function call.
   c) The number of occurrences of redundant code fragments is counted and added to the function call count, rather than including the redundant code in the volume measurements.
2. Promotion of Well-Known Libraries:
   a) The system identifies user-created code, functions, classes, and structures that are already available in well-known libraries or components provided within the organization.
   b) This user-created and redundant code is excluded from the volume measurements, as the developer should have used the well-known libraries or available code within the organization.
3. Final Reduction:
   a) After removing the redundant code and promoting the use of well-known libraries, the code is further reduced to its Minimal Form and translated into the Common Representation.

By employing this detailed Code Volume Measurement process, the AI-Enhanced Programming Code Value Assessment System ensures an accurate and comprehensive assessment of the code created by developers, taking into account factors such as redundancy, the utilization of well-known libraries, and the reduction of code to its essential elements. This embodiment provides a granular and objective measure of code volume, which serves as a critical component in determining the overall value and productivity of a developer's work.

Example Two

In example two, a detailed Code Impact Assessment Methodology is described. The AI-Enhanced Programming Code Value Assessment System employs a comprehensive methodology for assessing the Code Impact of each code segment. The Text-Based AI Model with Contextual Understanding (TBM-CU) evaluates the code segment across five key categories and assigns points based on predefined criteria. The categories and their corresponding point ranges are as follows:

Code Effectiveness (0-2 Points):
   The TBM-CU analyzes the code segment to determine the ratio of the value added to the system's behavior relative to the complexity introduced by the code changes.
   It assesses whether the modifications to the system's functionality, performance, or quality are commensurate with the extent of changes made to the codebase.
   The code segment is evaluated against industry best practices and design principles to ascertain its level of effectiveness in delivering value while minimizing complexity and promoting established design patterns.
Rationale: The highest number of points is awarded to code segments that demonstrate a highly favorable balance between the value added and the complexity introduced, promoting the adoption of efficient and maintainable solutions that significantly enhance the project's capabilities without undue intricacy.

Code Complexity (0-1 Point):
The TBM-CU determines the inherent complexity of the code segment, considering elements such as the number of control flow statements, nested loops, recursive functions, and intricate data structures.
The structure, dependencies, and interactions within the code are analyzed to evaluate its complexity.
Rationale: Points are awarded to reflect the developer's capability to effectively manage and implement robust and complex solutions.

Code Performance (0-2 Points):
The potential impact of the code segment on overall project performance is assessed by the TBM-CU.
Evaluations include whether the code introduces optimizations, enhances efficiency, or mitigates performance bottlenecks.
Common performance patterns such as caching mechanisms, parallel processing, or resource optimization techniques are identified.
Rationale: This category acknowledges improvements that directly enhance system performance, crucial for operational efficiency and user satisfaction.

Code Scalability (0-1 Point):
The scalability of the code segment is evaluated, particularly its capacity to handle increased data volumes, concurrent users, or distributed processing.
The use of scalable architectures, load balancing techniques, and distributed computing principles are assessed.
Rationale: Importance is placed on ensuring the software can scale and manage increased loads without degrading performance.

Code Security (0-2 Points):
Security measures embedded within the code segment are scrutinized by the TBM-CU.
Assessments determine how well the code protects data and operations against unauthorized access and vulnerabilities.
The implementation of encryption, secure data handling, and adherence to security best practices, such as SOC2 standards, are analyzed.
Rationale: Security is recognized as paramount, especially in applications where data protection is critical, with points awarded to reflect the segment's ability to safeguard sensitive data and maintain user trust.

The points awarded in each category are based on the TBM-CU's analysis of the code segment's characteristics and its alignment with the predefined criteria. The total points across all categories are then used to calculate the Code Impact Multiplier (CIM) using the following formula:

$$CIM=1+(\text{Code Effectiveness}+\text{Code Complexity}+\text{Code Performance}+\text{Code Security})/2.$$

This formula ensures that the CIM is always greater than or equal to 1, reflecting the importance of high-impact code in the overall Code Value calculation. The range of the CIM is from 1 to 5, aligning the value of the code with the labor costs associated with varying levels of developer expertise, from junior to senior.

By employing this detailed Code Impact Assessment Methodology, the AI-Enhanced Programming Code Value Assessment System provides a comprehensive and nuanced evaluation of each code segment's impact on the project. The TBM-CU's analysis across multiple dimensions, including Code Effectiveness, Code Complexity, Code Performance, Code Scalability, and Code Security, ensures that the system accurately captures the varying degrees of impact and their contribution to the overall value of the code.

Example Three

In example 3, a detailed Code Quality Assessment is described. The AI-Enhanced Programming Code Value Assessment System employs a comprehensive methodology for assessing the Code Quality of each code segment. The Text-Based AI Model with Contextual Understanding (TBM-CU) evaluates the code segment across seven sub-scores, each focusing on a specific aspect of code quality. The sub-scores and their corresponding ranges are as follows:

Code Readability and Documentation Quality (CRDQ Score Range: 0.0-0.1):
This score represents the clarity and ease of understanding of the code, which is crucial for ensuring that other developers can maintain and extend the code without undue difficulty.
The TBM-CU examines the completeness, clarity, and relevance of the documentation accompanying the code. Good documentation supports the understandability and usability of the code by other developers.

Adherence to Best Coding Practices (ABC Score Range: 0.0-0.1):
This score represents how well the code follows established programming standards and best practices, which are essential for reducing technical debt and improving code reliability.
The TBM-CU examines the code's adherence to industry-standard coding conventions, such as consistent naming conventions, proper indentation, and modularization. It also assesses the use of design patterns, code organization, and the separation of concerns, which contribute to maintainability and extensibility.

Code Testability (CT Score Range: 0.0-0.1):
This score represents how easily the code can be tested.
The TBM-CU examines the presence of testable functions, appropriate use of dependency injection, and an overall design that facilitates testing. It assesses the code's modularity, the presence of unit tests, and the use of testing frameworks and tools.

Error Handling (EH Score Range: 0.0-0.1):
This score represents the code's adherence to proper input validation and robust error handling mechanisms, which are critical for ensuring system reliability.
The TBM-CU examines the code's error handling practices, including the use of exception handling, logging, and graceful degradation. It assesses the code's ability to handle edge cases, invalid inputs, and unexpected scenarios.

Code Redundancy (CR Score Range: 0.0-1.0):
This score represents the proper modular design and logical structure of the code segment, promoting code reuse and reducing duplication.
The score is calculated as the ratio of the Effective Code Volume measure (ECV) to the Code Volume Measure (CV): Code Redundancy Score=ECV/CV. A higher ratio indicates a more efficient and non-redundant code structure.

Code Bugginess (CB Score Range: 0.0-1.0):
This score represents the frequency and severity of bugs in each code segment.
The TBM-CU examines the committed code segment and compares it to previous commits to assess the frequency and severity of introduced bugs. It analyzes bug patterns, their potential impact on the system, and the effort required to resolve them. The score is calculated based on the number and criticality of identified bugs, with a higher score indicating fewer and less severe bugs.

Code Impact Potential (CIP Score Range: 0.0-1.0):
This score represents whether the code has appropriately leveraged advanced coding techniques to maximize Code Impact.
The score is calculated as the ratio of the actual Code Impact to the Maximum Achievable Impact for the given code segment: Impact Potential=Code Impact/Max Achievable Impact. A higher ratio indicates that the code has effectively utilized advanced techniques to achieve its potential impact.

The Code Quality Multiplier (CQM) is calculated as a weighted average of the sub-scores, with weights assigned to each sub-score based on their importance and impact on the overall code quality. The weights are as follows:

Code Readability and Documentation Quality: W1=2.
Rationale: Readable code and comprehensive documentation are essential for maintainability and collaboration, enabling other developers to understand and work with the codebase effectively.

Adherence to Best Coding Practices: W2=1.
Rationale: Following established programming standards and best practices ensures consistency, reduces technical debt, and improves overall code reliability and maintainability.

Code Testability: W3=3.
Rationale: Testable code is crucial for ensuring software quality, reducing bugs, and enabling efficient debugging and maintenance processes. Higher weight is assigned to testability due to its significant impact on the overall robustness and reliability of the codebase.

Error Handling: W4=2.
Rationale: Proper error handling is essential for building resilient systems that can gracefully handle unexpected scenarios and maintain stability. It contributes to the overall reliability and user experience of the software.

Code Redundancy: W5=2.
Rationale: Minimizing code redundancy through modular design and reusability helps optimize codebase size, improves maintainability, and reduces the risk of introducing bugs when making changes.

Code Bugginess: W6=7.
Rationale: The presence of bugs significantly impacts the quality and reliability of the code. A higher weight is assigned to this sub-score to emphasize the importance of identifying and minimizing bugs, as they can have severe consequences on the system's functionality and user experience.

Code Impact Potential: W7=3.
Rationale: Recognizing and rewarding the effective use of advanced coding techniques that maximize code impact encourages developers to strive for innovative and efficient solutions. It promotes the adoption of best practices and drives the overall quality and performance of the codebase.

The Quality Score is calculated as a weighted average of the sub-scores using the following formula:

$$CQM=(CRDQ \times W1 + ABC \times W2 + CT \times W3 + EH \times W4 + CR \times W5 + CB \times W6 + CIP \times W7)/(W1+W2+W3+W4+W5+W6+W7).$$

By employing this detailed Code Quality Assessment methodology, the AI-Enhanced Programming Code Value Assessment System provides a comprehensive and nuanced evaluation of each code segment's quality. The TBM-CU's analysis across multiple dimensions ensures that the system accurately captures the varying degrees of quality and their contribution to the overall value of the code.

Example Four

In Example four, a detailed Code Value Indicator (CVI) Calculation is described. The AI-Enhanced Programming Code Value Assessment System calculates the Code Value Indicator (CVI) for each code segment by multiplying three key components: Effective Code Volume (ECV), Code Impact Multiplier (CIM), and Code Quality Multiplier (CQM). The formula for calculating the CVI is as follows: CVI=ECV×CIM×CQM.

Code Volume:
This metric quantifies the extent of code produced by a developer, serving as a direct measure of the developer's productivity.
The Effective Code Volume is used in the CVI calculation, which considers factors such as code redundancy and the promotion of well-known libraries, as described in the Code Volume Measurement section.

Code Impact:
This measure evaluates the significance of the code in the context of the overall project.
It assesses the code's contributions to the functionality, performance, and objectives of the project, reflecting its importance within the broader project scope.
The Code Impact Multiplier (CIM) is derived from the Code Impact Assessment, which assigns points based on factors such as Code Effectivenes, Code Complexity, Code Performance, Code Scalability, and Code Security. The CIM is calculated using the formula: CIM=1+(Code Effectiveness+Code Complexity+Code Performance+Code Security)/2.
The CIM is designed to reward the use of advanced programming techniques and methodologies that significantly advance the project. It is always greater than or equal to 1, with higher values indicating a greater impact.

Code Quality Score:
This score assesses the overall quality of both the code and its accompanying documentation.
It considers factors such as readability, reusability, testability, and the presence or absence of defects, ensuring that the CVI accounts for both the volume and the integrity of the code, with an emphasis on adherence to established best practices and coding standards.
The Code Quality Multiplier (CQM) is calculated as a weighted average of the sub-scores, which include Code Readability and Documentation Quality, Adherence to Best Coding Practices, Code Testability, Error Handling, Code Redundancy, Code Bugginess, and Code Impact Potential. The weights assigned to each sub-score reflect their importance and impact on the overall code quality.

The CQM is designed to penalize code that falls short of the expected quality standards. It ranges from 0 to 1, with lower values indicating a greater negative impact on the code's value due to poor quality practices.

By multiplying the Effective Code Volume, CIM, and CQM, the CVI provides a comprehensive numerical representation of the code segment's value, considering its volume, impact, and quality. This allows for meaningful comparisons between code segments and enables the tracking of productivity trends over time.

The CVI serves as an effective tool for project managers and stakeholders to make informed decisions regarding resource allocation, performance evaluation, and team optimization. By providing an objective and actionable metric, the CVI enhances project management and supports data-driven decision-making for the continual improvement of software development processes.

Example Five

In example 5, Multi-Level Productivity Comparisons are described. In this example, the AI-Enhanced Programming Code Value Assessment System employs normalization and comparison techniques, leveraging its extensive database to provide contextual insights into developer productivity. These comparisons are performed at multiple levels:

Individual Developer's Current Productivity Vs Past Productivity:
 The system compares the developer's productivity to their own historical productivity for Pvol, Pimpact, Pquality, and Pvalue.
 This comparison helps identify trends and improvements in the developer's performance over time.

Team-Level Comparison:
 The developer's productivity is compared to the average or median productivity of other developers within the same team.
 The system calculates the developer's percentile rank or standard deviation from the team's average to assess their performance relative to peers for Volume, Impact, Quality, and Value.
 This comparison provides insights into the developer's performance within their immediate team environment.

Company-Level Comparison:
 The technology compares a developer's productivity to the average or median productivity of developers in similar roles across the entire company.
 It determines the developer's percentile rank or standard deviation from the company's average for their role, evaluating their performance within the organization.
 This comparison helps identify top performers and assess the developer's contribution to the company's overall productivity.

Regional Comparison:
 The system compares a developer's productivity to the average or median productivity of developers in similar roles within the same geographical region.
 It calculates the developer's percentile rank or standard deviation from the regional average to assess their performance relative to developers in the same area.
 This comparison takes into account regional differences in productivity standards and helps identify high-performing developers within specific geographical contexts.

The technology defines several levels of geographical regions for comparative normalization, including:
 Specific areas (e.g., Silicon Valley, East Coast, European Union),
 States or provinces (e.g., California, Bavaria),
 Cities (e.g., San Francisco, Berlin, Warsaw),
 Countries (e.g., USA, Germany, Poland),
 Continents (e.g., North America, Europe, Asia), and
 Global comparisons.

By providing these multi-level comparisons, the system offers valuable insights into a developer's performance relative to various benchmarks. This information can be used to:
 Identify top performers and recognize their contributions,
 Evaluate the quality and value of subcontractors or outsourced development teams,
 Allocate resources effectively based on productivity metrics,
 Make data-driven decisions for team management and career development, and
 Identify areas for improvement and training opportunities.

The visualizations and reports generated by the system present the productivity metrics in a clear and accessible format, enabling stakeholders at all levels to understand and interpret the data easily. The interface may include interactive features, such as filters and drill-down capabilities, to allow users to explore the data and gain deeper insights into developer productivity trends and patterns.

By leveraging advanced scoring mechanisms and a comprehensive database, the AI-Enhanced Programming Code Value Assessment System provides actionable insights that can drive improvements in software development processes and workforce management. The multi-level productivity comparisons offered by the system enable organizations to make informed decisions, optimize resource allocation, and foster a culture of continuous improvement in software development.

Example Six

In example 6, system for Productivity Tracking and Resource Allocation in Mixed Development Teams are described. The AI-Enhanced Programming Code Value Assessment System is configured to track the productivity of mixed development teams consisting of internal human developers, external subcontractors, and AI developers (AI Tools). The system employs advanced evaluation metrics to determine the efficiency and quality of code contributions from various team configurations, enabling strategic decisions about resource allocation and development methodologies.

System Functionality and Deployment: The system incorporates an AI Peer Review Module (APRM) that utilizes Text-Based AI Models with Contextual Understanding (TBM-CUs) to continuously assess the contributions of each team member. It employs the Code Value Indicator (CVI), which integrates assessments of Code Volume, Impact, and Quality, to offer a comprehensive view of individual and collective productivity within the team.

Operational Features:
 Productivity Metrics Integration: The system calculates detailed productivity metrics for each team member, including internal and external human developers as well as AI developers. These metrics are derived from CVI scores accumulated over time and are adjusted to reflect the complexity and scope of assigned tasks.

Dynamic Resource Allocation: Based on historical productivity data and the current requirements of the project, the system generates recommendations for adjusting the development approach. This includes guidance on project components best suited for internal development, those that can be outsourced, and those most efficiently addressed by AI developers.

AI Developer Utilization: The system evaluates the efficiency of AI Tools in executing tasks that benefit from automation, such as repetitive processes or complex problem-solving that can leverage machine learning technologies. It assesses the impact and efficiency of integrating AI developers into the project workflow.

System Capabilities:

Real-Time Monitoring: The system offers continuous monitoring of code contributions to enable real-time assessment of productivity for individual developers and teams. This feature supports immediate adjustments in project management strategies based on up-to-date performance data.

Insightful Development Analytics: By analyzing trends in productivity and code quality, the system provides insights into the most effective configurations of internal, external, and AI-driven development efforts. These insights are instrumental in strategic planning for current and future projects.

Predictive Resource Allocation: Employing predictive analytics, the system forecasts project outcomes under various resource allocation scenarios. It recommends optimal distributions of internal, external, and AI resources to achieve the best combination of efficiency, cost-effectiveness, and quality.

Advantages of the System:

Informed Decision-Making: The system equips project managers with robust data-driven insights, enhancing decision-making capabilities concerning resource distribution, which can lead to cost reductions and improved project timelines.

Adaptive Project Management: Knowledge of the productivity strengths of different types of developers allows for flexible and responsive project management, enabling quick scalability adjustments in response to project demands.

Strategic Integration of AI Tools: Identifying the most beneficial applications of AI developers ensures that their integration is both economically and operationally advantageous.

Consistent Quality Maintenance: The system's continuous monitoring of code quality across various sources helps uphold high-quality standards throughout the project lifecycle.

For example, consider a complex software development project requiring a secure and robust architecture. The system may recommend that critical infrastructure development be handled internally due to its sensitive nature, routine maintenance be outsourced for efficiency, and data-intensive processes be assigned to AI developers to capitalize on advanced computational capabilities.

This example demonstrates how the AI-Enhanced Programming Code Value Assessment System can be effectively applied to manage diverse development teams by tracking productivity and optimizing resource allocation, thereby improving project efficiency and outcomes.

Example Seven

In this example, Benchmarking and Validation System for Developer Productivity and Compensation are described. This example of the AI-Enhanced Programming Code Value Assessment System leverages its benchmarking capabilities to provide developers and subcontractors with validated productivity scores. These scores substantiate compensation claims in negotiations for salaries and project rates and are used for marketing and professional development purposes.

System Functionality:

Productivity Scoring: Utilizes the AI Peer Review Module (APRM) to assess individual performance metrics such as Code Volume, Code Impact, and Code Quality. Scores are benchmarked against aggregated data from similar roles and projects to ensure fairness and accuracy.

Certification of Productivity Scores: Developers and subcontractors can obtain official certification of their productivity scores from the system. These certifications can be used during salary negotiations and to enhance marketing materials.

Dynamic Updates: Benchmarks are regularly updated based on the latest project data to maintain relevance and accuracy, reflecting current industry standards.

Operational Use:

Compensation Negotiations: Developers and subcontractors use the validated scores to justify their pricing or salary expectations in contractual discussions.

Marketing Tool: Subcontractors utilize these certifications in their marketing efforts to demonstrate proven productivity and efficiency to potential clients.

Professional Development: Individual developers include these productivity scores in their CVs and professional profiles to enhance job marketability and career opportunities.

Real-Time Updates: Allows for ongoing adjustment of productivity scores, providing developers and subcontractors with a current and competitive edge in job markets and project bids.

Benefits:

Transparency and Credibility in Compensation Negotiation: Provides a solid, data-driven foundation for salary discussions, enhancing the bargaining power of developers.

Enhanced Market Differentiation: Enables developers and subcontractors to differentiate themselves in competitive markets based on validated performance metrics.

Marketing Advantage: Subcontractors can leverage productivity certifications as a unique selling point in their promotional activities, attracting more clients by showcasing their efficiency and quality.

CV Enhancement: Helps individual developers stand out by incorporating verified productivity metrics into their resumes and online profiles, supporting career advancement.

By employing this system, software development professionals and subcontractors can leverage their productivity scores, validated by a trusted AI-powered system, to negotiate compensation that accurately reflects their contributions and capabilities. Additionally, the ability to use these certifications for marketing and CV enhancement underscores the embodiment's role in facilitating fair, transparent, and data-driven employment practices in the software development industry.

Example Eight

In example 8, the AI Tools Adoption Score Calculation for Human Developers is described. The AI Tools Adoption Score is calculated as follows:

AI Adoption in Documentation (AI_Doc_Gen_Adoption), where:
  This sub-score assesses the extent to which AI tools are used by human developers for generating comments and documentation.
  It is calculated as the ratio of the number of AI-generated comment characters to the total number of comment characters in the created documentation, including comments.

AI_Doc_Gen_Adoption=number_of_AI_generated_comment_chars/
      total_number_of_comment_chars.

AI Adoption in Coding (AI_Code_Gen_Adoption):
  This sub-score evaluates the degree to which AI tools are utilized by human developers for code generation.
  It is calculated as the ratio of the AI-generated code volume to the total code volume, where the volume is represented by the Effective Volume measure (for both AI-generated and total volume).

AI_Code_Gen_Adoption=AI_generated_code_volume/
      total_code_volume.

AI Tools Adoption Score:
  The overall AI Tools Adoption Score is the average of the AI_Doc_Gen_Adoption and AI_Code_Gen_Adoption sub-scores.

AI_Tools_Adoption_Score=(AI_Doc_Gen_Adoption+AI_Code_Gen_Adoption)/2.

The score is normalized to a float value between 0.0 and 0.9, where 0.0 indicates no AI tool adoption and 0.9 represents full adoption of the AI tools for documentation and code generation (while the developer still reviews and iterates the code generation with the use of these tools).

By monitoring the AI Tools Adoption Score of human developers over time and analyzing its correlation with other key measures, project managers can gain valuable insights into the benefits of AI transformation and compare the performance of autonomous AI development tools. This data-driven approach empowers managers to:
  Identify the types of tasks and project areas where human developers can effectively leverage AI tools to increase productivity, improve code quality, and achieve higher overall project value.
  Evaluate the quality and performance of different autonomous AI development tools (AI developers) to select the best product or service in terms of cost and quality, ensuring the most effective use of AI resources within the project.
  Determine the optimal allocation of tasks between human developers and AI-based systems based on their respective strengths and the project's specific requirements, maximizing the overall efficiency and quality of the development process.
  Monitor the impact of AI tool adoption on development processes, facilitating continuous improvement and refinement of AI integration strategies to ensure the most effective use of both human and AI resources.
  Justify investments in AI tools and resources by demonstrating their tangible benefits in terms of productivity gains, cost savings, and enhanced project outcomes, enabling data-driven decision-making for resource allocation and budgeting.
  Foster a culture of innovation and continuous learning by encouraging human developers to embrace and effectively utilize AI tools, ultimately elevating their skills and capabilities, and promoting a collaborative environment where human and AI developers work together seamlessly.

Example Nine

In example 9, AI Tools Adoption Score for Fully Autonomous AI Developers is described. The AI Tools Adoption Score is set to 1.0 in the user settings within the invented system, clearly distinguishing between human and AI programmers. The performance and output of AI developers are evaluated using the same key measures as human developers, namely Code Volume, Code Impact, and Code Quality, enabling a fair comparison and effective allocation of tasks between human and AI resources.

This example highlights how the AI Tools Adoption Score can be used to differentiate between human developers and fully autonomous AI developers, while still applying the same performance metrics to both. By setting the score to 1.0 for AI developers, the system acknowledges their full reliance on AI tools and enables project managers to compare their performance directly with that of human developers. This facilitates data-driven decision-making when allocating tasks and resources, ensuring that the strengths of both human and AI developers are optimally utilized to achieve project goals efficiently and effectively.

Example Ten

In example 10, AI Peer Review Module (APRM) for Compliance Monitoring and Documentation in Medical Software Development is described. The AI-Enhanced Programming Code Value Assessment System is applied to a medical software development project where adherence to regulatory guidelines and compliance frameworks, such as FDA regulations, HIPAA for data protection, and SOC2 for software data protection, is critical. The AI Peer Review Module (APRM) is configured to monitor the codebase for compliance with these standards.

The project involves an outsourced team responsible for developing the backend component that facilitates data exchange between workstations. The subcontractor is required to adhere to the project specifications and all relevant compliance frameworks. To ensure seamless collaboration and maintain code quality, the subcontractor is granted access to the common repository where the APRM oversees their contributions.

The APRM is customized with the necessary rulesets and thresholds to validate the code against FDA regulations, HIPAA guidelines, and SOC2 requirements. It continuously scans the codebase, including the contributions from the outsourced team, and provides real-time feedback on any deviations or non-compliant code segments. The APRM generates detailed reports highlighting the specific areas of non-compliance, along with recommendations for remediation.

Furthermore, the APRM automatically generates the necessary documentation for audits, covering both the internal team's work and the outsourced contributions. This documentation includes evidence of compliance, code quality metrics, and remediation efforts. The automated documentation process saves significant time and effort, ensuring that the project remains audit-ready throughout the development lifecycle.

By leveraging the APRM, the medical software development project benefits from:

Continuous monitoring of compliance with FDA regulations, HIPAA, and SOC2 requirements across internal and external teams.

Real-time feedback and guidance for developers to maintain compliance and adhere to best practices.

Automated generation of audit-ready documentation, reducing manual effort and ensuring accurate and up-to-date records.

Seamless integration of outsourced contributions while maintaining code quality and compliance standards.

Reduced risk of non-compliance issues and improved overall software quality.

This example highlights the versatility and value of the AI-Enhanced Programming Code Value Assessment System in managing complex, regulated software development projects involving both internal and external teams. It demonstrates how the technology streamlines compliance monitoring, ensures code quality, and automates documentation processes, ultimately saving time, reducing risks, and enhancing the overall efficiency of the development lifecycle.

Example Eleven

In example 11, AI Peer Review Module (APRM) for Compliance Monitoring and Documentation in Regulated Industries is described. The AI-Enhanced Programming Code Value Assessment System is applied to software development projects in regulated industries where adherence to industry-specific compliance frameworks is crucial. The AI Peer Review Module (APRM) is configured to monitor the codebase for compliance with these frameworks and ensures that both internal and external teams adhere to the required standards.

The regulated industries covered in this embodiment include:

Military and Defense with compliance frameworks including: ITAR (International Traffic in Arms Regulations), EAR (Export Administration Regulations), DFARS (Defense Federal Acquisition Regulation Supplement).

Finance and Fintech with compliance frameworks including: PCI DSS (Payment Card Industry Data Security Standard), GLBA (Gramm-Leach-Bliley Act), SOX (Sarbanes-Oxley Act), KYC (Know Your Customer), AML (Anti-Money Laundering).

Healthcare and Life Sciences with compliance frameworks including: HIPAA (Health Insurance Portability and Accountability Act), FDA (Food and Drug Administration) regulations, GxP (Good Clinical, Laboratory, and Manufacturing Practices).

Energy and Utilities with compliance frameworks including: NERC CIP (North American Electric Reliability Corporation Critical Infrastructure Protection), IEC 62443 (Industrial Automation and Control Systems Security), NIST SP 800-82 (Guide to Industrial Control Systems Security).

Government and Public Sector with compliance frameworks including: FISMA (Federal Information Security Management Act), NIST SP 800-53 (Security and Privacy Controls for Federal Information Systems and Organizations), FedRAMP (Federal Risk and Authorization Management Program).

The APRM is customized with the specific rulesets and thresholds for each industry's compliance frameworks. It continuously scans the codebase, including contributions from both internal and external teams, and provides real-time feedback on any deviations or non-compliant code segments. The APRM generates detailed reports highlighting areas of non-compliance and provides recommendations for remediation.

Furthermore, the APRM automatically generates the necessary documentation for audits and compliance reporting, covering the work of both internal and external teams. This automated documentation process ensures that the project remains audit-ready and compliant with the relevant frameworks throughout the development lifecycle.

By leveraging the APRM, software development projects in regulated industries benefit from:

Continuous monitoring of compliance with industry-specific frameworks across internal and external teams.

Real-time feedback and guidance for developers to maintain compliance and adhere to best practices.

Automated generation of audit-ready documentation, reducing manual effort and ensuring accurate and up-to-date records.

Seamless integration of external contributions while maintaining code quality and compliance standards.

Reduced risk of non-compliance issues and improved overall software quality.

This example highlights the adaptability and value of the AI-Enhanced Programming Code Value Assessment System in managing software development projects in various regulated industries. It demonstrates how the technology can be customized to address industry-specific compliance requirements, ensuring that both internal and external teams adhere to the necessary standards and frameworks.

Example Twelve

In example 12, AI Peer Review Module—Manual Review Escalation Criteria is described. In this example, the AI Peer Review Module (APRM) incorporates a set of criteria for escalating code reviews to a manual process involving senior developers, technical leads, or subject matter experts. The module identifies certain situations where additional insights and guidance from experienced professionals are necessary to ensure code quality and compliance.

The criteria for manual review escalation or notification include:

Code Complexity: When the APRM detects highly complex code segments that require expert analysis and review.

Criticality of the identified issues: If the APRM identifies critical issues that may have a significant impact on the project's functionality, security, or compliance.

Detection of low effort or subpar performance: When the APRM identifies code segments that demonstrate low effort or subpar performance compared to the programmer's usual standards.

Frequent or repeated introduction of bugs: If the APRM detects that a programmer frequently or repeatedly introduces bugs in the same code segments.

Detection of potential malicious code patterns: When the APRM identifies code patterns that may indicate malicious intent or pose security risks.

Inclusion of external libraries or dependencies without proper licensing: If the APRM detects the use of external libraries or dependencies without proper licensing information.

Identification of code segments with significant potential for improvement: When the APRM identifies code segments that have substantial room for optimization or improvement.

When a code review is escalated based on these criteria, the APRM generates a detailed report outlining the reasons for escalation, along with relevant findings, suggestions, and recommendations. This report serves as a starting point for the manual review process, which involves collaboration between the programmer and the designated reviewers to address the identified issues and ensure the code meets the required standards.

By incorporating these manual review escalation criteria, the APRM ensures that critical code segments receive the necessary attention and expertise, ultimately enhancing the overall quality and reliability of the software development project.

Example Thirteen

In example 13, AI Peer Review Module—Approval and Revision Thresholds is descry bed. In this example, the AI Peer Review Module (APRM) implements predefined thresholds for automatic code approval and revision requirements. These thresholds are based on the Quality Scores assigned to each code segment and ensure consistent and objective code review outcomes.

Automatic Approval Criteria:
- If the Quality Score for each code segment in a commit surpasses a predefined threshold (e.g., 0.8), the code review is automatically passed.
- Even if the code is approved, the APRM may provide recommendations for future improvements based on areas where the Quality Score can be further enhanced.

Revision and Resubmission Criteria:
- If the Quality Score for any code segment falls below the predefined threshold, the code review is not passed, and the code requires revision and resubmission by the programmer.
- The APRM provides specific feedback and suggestions for improvement based on the unmet Quality Score metrics.
- The programmer must address the identified issues and resubmit the code for review.

The predefined thresholds for automatic approval and revision can be customized based on the project's requirements, industry standards, or organizational policies. These thresholds ensure that only code segments meeting the desired quality standards are approved, while those falling short are flagged for revision and improvement.

By implementing these approval and revision thresholds, the APRM maintains a consistent and objective code review process, promoting high code quality and driving continuous improvement among programmers. The clear criteria for approval and revision help programmers understand the expected standards and provide them with actionable feedback for enhancing their code quality.

Example Fourteen

In example 14, Communication Module—Interactive Prompting Feature Capabilities is described. The AI-Enhanced Programming Code Value Assessment System includes an interactive prompting feature that enables users to engage directly with the Text-Based AI Models with Contextual Understanding (TBM-CUs) through a chat-like interface within the system's dashboard. This feature provides the following capabilities:

Real-Time Dialogue: Users can ask questions and receive instant, context-aware responses from the TBM-CUs, allowing them to gain deeper insights into code impact, functionality, and the rationale behind specific evaluations.

Context-Aware Responses: The TBM-CUs utilize the context of the entire project to provide precise and relevant responses, ensuring that communications are accurate and pertinent to the current project stage and user concerns.

Plain Language Processing: The TBM-CUs articulate responses in plain language, making technical information accessible and understandable to non-technical stakeholders, bridging communication gaps within project teams.

By integrating this interactive prompting feature, the Communication Module simplifies the interpretation of complex technical data, engages stakeholders directly, and enhances overall project communication and success.

Example Fifteen

In example 15, the Communication Module—Stakeholder-Specific Summary Generation is described. In this example, the AI-Enhanced Programming Code Value Assessment System generates summaries tailored to the expertise level and interests of various stakeholders. This feature extracts essential information from the system's evaluations of developer performance, based on Code Volume, Code Impact, Code Quality, and Code Value, and processes this information into summaries designed for specific audiences.

For example, summaries for project managers focus on project alignment and impact metrics, while those for business stakeholders emphasize enhancements in product functionality and user experience. The module also generates technical summaries for developers, providing insights into code quality, best practices, and areas for improvement.

These summaries are displayed on an interactive dashboard that updates in real-time and provides both comprehensive views and detailed drill-down options, enabling informed decision-making across various project levels. By generating stakeholder-specific summaries, the Communication Module ensures that all team members, regardless of their technical expertise, are kept informed and can actively participate in project discussions and decisions.

Example Sixteen

In example 16, Integration with Version Control Systems are described. In this example, the AI-Enhanced Programming Code Value Assessment System is seamlessly integrated with widely-used version control systems, including but not limited to Git, GitHub, GitLab, and Bitbucket. The integration is achieved through the utilization of the version control systems' Application Programming Interfaces (APIs), which enable the AI-Enhanced Programming Code Value Assessment System to interoperate with the repositories and access the necessary code and metadata.

Upon a developer committing code changes to a repository hosted on a supported version control platform, the AI-Enhanced Programming Code Value Assessment System automatically initiates an analysis of the submitted code. The analysis is performed by employing advanced Text-Based AI Models with Contextual Understanding (TBM-CUs), which possess the capability to comprehend and evaluate code semantics, structure, and quality.

The integration between the AI-Enhanced Programming Code Value Assessment System and the version control platforms is facilitated through the execution of structured API calls. These API calls, such as RESTful HTTP requests, are precisely formulated to retrieve the required code and associated metadata from the repositories. The system leverages the authentication and authorization mechanisms provided by the version control platforms to ensure secure access to the repositories and maintain the integrity of the codebase.

The API calls are constructed to target specific endpoints exposed by the version control platforms, enabling the AI-Enhanced Programming Code Value Assessment System to retrieve the code changes submitted by the developers. The system employs techniques such as token-based authentication or OAuth to establish secure communication channels and authenticate itself to the version control platforms. This ensures that only authorized instances of the AI-Enhanced Programming Code Value Assessment System can access and analyze the code.

Upon successfully retrieving the code and metadata through the API calls, the AI-Enhanced Programming Code Value Assessment System initiates the code evaluation process. The TBM-CUs, which form the core of the system's analytical capabilities, are invoked to perform a comprehensive examination of the submitted code. These models are trained on vast amounts of code data and possess the ability to understand the intricacies of programming languages, coding patterns, and best practices.

The TBM-CUs employ advanced natural language processing techniques, such as tokenization, parsing, and semantic analysis, to deconstruct the code and extract meaningful insights. They assess various aspects of the code, including its structure, readability, complexity, performance, security, and adherence to industry-standard best practices. The models also consider the contextual information associated with the code, such as comments, documentation, and project-specific guidelines, to provide a holistic evaluation.

The integration of the AI-Enhanced Programming Code Value Assessment System with version control platforms enables real-time code evaluation, offering developers immediate feedback on the quality and compliance of their code changes. As soon as a developer commits code to the repository, the system swiftly analyzes the code and generates comprehensive feedback reports. These reports highlight potential issues, suggest improvements, and provide recommendations for adhering to best practices and coding standards.

The feedback generated by the AI-Enhanced Programming Code Value Assessment System is seamlessly integrated into the developer's workflow through the version control platform's interface. Developers can access the feedback directly within their version control system, allowing them to review the analysis results, address identified issues, and iterate on their code changes efficiently. The system's integration ensures that developers receive timely and actionable insights, enabling them to continuously improve the quality and maintainability of their codebase.

Moreover, the AI-Enhanced Programming Code Value Assessment System's integration with version control platforms supports collaboration and code review processes. The system can automatically notify relevant stakeholders, such as team leads or code reviewers, when specific code changes require attention or further review. This integration streamlines the code review workflow, ensuring that critical code changes are promptly addressed, and feedback is incorporated into the development process.

The integration with version control systems empowers the AI-Enhanced Programming Code Value Assessment System to provide real-time, context-aware code evaluation and feedback. By leveraging the APIs and capabilities of popular version control platforms, the system seamlessly integrates into the development workflow, enabling developers to receive immediate insights and recommendations for improving code quality, adherence to best practices, and overall software development efficiency.

Example Seventeen

In example 17, Integration with Integrated Development Environments (IDEs) is described. In this example, the AI-Enhanced Programming Code Value Assessment System is integrated with widely-used Integrated Development Environments (IDEs) and code editors, including but not limited to Visual Studio Code, IntelliJ IDEA, Eclipse, and Sublime Text. The integration is achieved through the development and deployment of dedicated plugins or extensions that seamlessly integrate the system's functionality into the developers' coding environment.

The plugins or extensions are designed to establish a bi-directional communication channel between the AI-Enhanced Programming Code Value Assessment System and the IDEs. This communication channel enables the system to receive real-time code updates from the IDEs and provide instant feedback, suggestions, and alerts based on the analysis of the code.

The integration process begins with the installation of the AI-Enhanced Programming Code Value Assessment System plugin or extension within the IDE. The plugin or extension is developed using the IDE's specific extension framework or API, ensuring compatibility and seamless integration with the IDE's existing features and user interface.

Once installed, the plugin or extension establishes a secure connection with the AI-Enhanced Programming Code Value Assessment System's backend infrastructure. This connection allows the plugin to transmit the developer's code in real-time to the system for analysis. The code is sent incrementally as the developer writes or modifies the code, ensuring that the analysis is performed on the most up-to-date version of the codebase.

Upon receiving the code, the AI-Enhanced Programming Code Value Assessment System employs its advanced Text-Based AI Models with Contextual Understanding (TBM-CUs) to perform a comprehensive analysis. The TBM-CUs, which are trained on vast amounts of code data and programming language semantics, examine the code for various quality metrics, best practices adherence, potential bugs, performance issues, and security vulnerabilities.

The analysis process is optimized for real-time performance, ensuring that the developer receives feedback and suggestions in a timely manner without disrupting their coding flow. The TBM-CUs utilize efficient algorithms and parallel processing techniques to quickly process the code and generate meaningful insights.

As the analysis is completed, the AI-Enhanced Programming Code Value Assessment System sends the results back to the IDE plugin or extension. The plugin or extension then presents the feedback, suggestions, and alerts to the developer directly within their coding environment. This integration eliminates the need for developers to switch between different tools or platforms to access the code assessment results.

The feedback provided by the system is presented in a user-friendly and intuitive manner, seamlessly integrating with the IDE's user interface. The plugin or extension may highlight specific lines of code or code segments that require attention, provide inline suggestions for improvements, or display alerts for critical issues that need immediate resolution.

Developers can interact with the feedback and suggestions directly within the IDE. They can review the identified issues, access detailed explanations and recommendations, and make necessary code changes based on the system's guidance. The plugin or extension may also provide options for developers to customize the level of feedback and the specific quality metrics they want to focus on.

The integration of the AI-Enhanced Programming Code Value Assessment System with IDEs offers several benefits to developers and organizations:

Real-time code analysis: Developers receive instant feedback on their code as they write it, allowing them to identify and address issues early in the development process.

Contextual insights: The system provides context-aware suggestions and recommendations based on the specific code being written, helping developers make informed decisions and adhere to best practices.

Streamlined workflow: By integrating the code assessment functionality directly into the IDE, developers can maintain their coding flow without the need to switch between different tools or platforms.

Enhanced code quality: The real-time feedback and suggestions help developers write higher-quality code, reducing the likelihood of bugs, performance issues, and security vulnerabilities.

Continuous learning: The system's feedback and explanations serve as a learning tool, helping developers improve their coding skills and stay up-to-date with industry best practices.

The integration with IDEs empowers developers to leverage the advanced capabilities of the AI-Enhanced Programming Code Value Assessment System seamlessly within their preferred coding environment. By providing real-time feedback, suggestions, and alerts, the system enables developers to make informed decisions, write high-quality code, and continuously improve their skills, ultimately leading to more efficient and effective software development processes.

Example Eighteen

In example 18, User Interface for Displaying Productivity Metrics and Visualizations is described. In this example, the AI-Enhanced Programming Code Value Assessment System provides a highly intuitive and interactive user interface designed to display productivity metrics and visualizations effectively. The user interface is built using modern web technologies and follows best practices in user experience (UX) and user interface (UI) design principles to ensure ease of use and optimal information delivery.

The central component of the user interface is a set of interactive dashboards that present a comprehensive overview of individual and team productivity metrics. These dashboards are designed to be visually appealing, utilizing a combination of charts, graphs, tables, and other data visualization techniques to convey information in a clear and concise manner.

The dashboards are organized into multiple sections, each focusing on specific aspects of productivity. The main sections include:

Code Value Dashboard: This dashboard presents the overall Code Value metric, which represents the cumulative value of the code contributed by individuals or teams. The Code Value is calculated based on the combination of Code Volume, Code Impact, and Code Quality metrics. The dashboard provides a high-level view of the Code Value trends over time, allowing users to identify patterns and track progress.

Code Volume Dashboard: The Code Volume dashboard displays metrics related to the quantity of code produced by individuals or teams. It includes visualizations such as bar charts or line graphs that show the volume of code written over specific time periods. Users can drill down into the data to view the code volume breakdown by project, module, or individual contributor.

Code Impact Dashboard: This dashboard focuses on the impact of the code contributed by individuals or teams. It presents metrics such as the number of features implemented, bugs resolved, or performance improvements achieved. The visualizations in this dashboard highlight the significance and value of the code changes made by developers.

Code Quality Dashboard: The Code Quality dashboard provides insights into the quality aspects of the code produced. It includes metrics such as code complexity, maintainability index, test coverage, and adherence to coding standards. The visualizations in this dashboard help identify areas where code quality can be improved and track the progress of quality initiatives over time.

The user interface incorporates interactive features that allow users to explore and analyze the data in depth. These features include:

Filtering and Sorting: Users can filter the data displayed in the dashboards based on various criteria, such as date range, project, team, or individual contributor. They can also sort the data based on specific metrics or attributes to identify top performers or areas requiring attention.

Drill-Down Functionality: The dashboards provide drill-down capabilities, enabling users to navigate from high-level overviews to more granular details. For example, users can click on a specific data point in a chart to view the underlying code commits, code reviews, or associated tasks.

Comparative Analysis: The user interface allows users to compare productivity metrics across different time periods, teams, or individuals. Users can select multiple entities and view their metrics side by side, facilitating benchmarking and identifying best practices.

Customizable Visualizations: The dashboards offer customization options, allowing users to tailor the visualizations to their specific needs. Users can choose different chart types, adjust the layout of the dashboards, and save their preferred configurations for future use.

Real-Time Updates: The user interface is designed to display real-time data, ensuring that the productivity metrics and visualizations are always up to date. As new code commits are made, and code assessments are completed, the dashboards automatically refresh to reflect the latest information.

To enhance the user experience and facilitate decision-making, the user interface also includes features such as:

Alerts and Notifications: The system can generate alerts and notifications based on predefined thresholds or significant changes in productivity metrics. These alerts are prominently displayed on the user interface, ensuring that users are promptly informed about important events or trends.

Contextual Help and Guidance: The user interface provides contextual help and guidance to assist users in interpreting the metrics and visualizations effectively. Tooltips, information icons, and inline explanations are used to provide additional insights and help users navigate the dashboards smoothly.

Report Generation and Export: Users can generate detailed reports based on the productivity metrics and visualizations displayed in the dashboards. These reports can be exported in various formats, such as PDF or CSV, allowing users to share the information with stakeholders or perform further analysis using external tools.

Integration with Other Tools: The user interface seamlessly integrates with other development tools and platforms used by the organization. For example, it can integrate with project management tools to display productivity metrics alongside project timelines or integrate with communication platforms to facilitate discussions and collaboration around productivity improvements.

The user interface is designed to be responsive and accessible across different devices and screen sizes, ensuring that users can access the productivity metrics and visualizations conveniently from their desktops, laptops, tablets, or mobile devices. The interface is optimized for performance, ensuring fast loading times and smooth interactions, even when dealing with large datasets.

To ensure the security and privacy of the productivity data, the user interface implements appropriate access controls and authentication mechanisms. Users are required to log in with their credentials, and the system enforces role-based access control (RBAC) to ensure that users can only access the data and functionality relevant to their roles and permissions.

The user interface also includes features to support collaboration and knowledge sharing among team members. Users can add comments, annotations, or discussions related to specific productivity metrics or visualizations, fostering a culture of continuous improvement and learning.

Overall, the user interface for displaying productivity metrics and visualizations in the AI-Enhanced Programming Code Value Assessment System is designed to be intuitive, informative, and actionable. It empowers users to gain valuable insights into individual and team productivity, identify areas for improvement, and make data-driven decisions to optimize resource allocation and drive project success. The interface combines advanced data visualization techniques with user-centric design principles to deliver a powerful and engaging user experience.

Example Nineteen

In example 19, AI Peer Review Module deploying Domain-Specific Agents for Enhanced Review is described. In this example, the AI Peer Review Module (APRM) incorporates a configurable set of domain-specific agents or modules, each built upon pre-trained Text-Based Models with Contextual Understanding (TBM-CUs) or enhanced using Retrieval-Augmented Generation (RAG) techniques. These agents are customized with specialized knowledge and expertise in a particular domain, industry, platform, or technical (internal or external) documentation allowing them to assess code contributions not only from a technical perspective but also in terms of compliance with domain-specific norms, industry standards, technical or platform-specific requirements, or internal technical, business or functional requirements of the user (company).

The domain-specific agents are created by fine-tuning pre-trained TBM-CUs or enhancing them using RAG techniques. This process involves training the models on relevant datasets, industry guidelines, and platform documentation to acquire the necessary domain-specific knowledge and expertise. The fine-tuning or RAG enhancement process allows the agents to adapt to the specific terminology, conventions, and best practices of the target domain or platform.

For example, to create an agent specializing in healthcare software development, a pre-trained TBM-CU can be fine-tuned using datasets containing HIPAA regulations, HL7 standards, and medical terminology. This fine-tuning process enables the agent to understand and apply healthcare-specific knowledge during the code review process, ensuring compliance with privacy and security guidelines while following industry best practices for healthcare data management.

Similarly, for a game development project targeting a specific platform like Steam, a pre-trained TBM-CU can be enhanced using RAG techniques to incorporate knowledge of Steam's technical requirements, API guidelines, and best practices for game development on that platform. The resulting agent can review code contributions to ensure compatibility, optimized performance, and adherence to the platform's standards and conventions.

The APRM allows for the flexible deployment and configuration of these domain-specific agents based on the specific needs and context of the project. During the peer review process, the APRM dynamically selects and applies the relevant domain-specific agents based on the project's configuration and the specific files or modules being reviewed. The agents work in conjunction with the general code review capabilities of the APRM, providing an additional layer of domain-specific analysis and guidance.

The benefits of incorporating domain-specific agents built upon pre-trained TBM-CUs or enhanced using RAG techniques include:

Leveraging Pre-trained Knowledge: By building upon pre-trained TBM-CUs, the domain-specific agents can leverage the extensive knowledge and language understanding capabilities already present in these models, reducing the amount of domain-specific training data required.

Efficient Customization: Fine-tuning or enhancing pre-trained TBM-CUs allows for efficient customization of the agents to specific domains or platforms, enabling rapid deployment and adaptation to new projects or industries.

Improved Contextual Understanding: The contextual understanding capabilities of TBM-CUs or RAG-enhanced models enable the domain-specific agents to better comprehend the context and intent behind code contributions, leading to more accurate and relevant feedback and recommendations.

Continual Learning and Updating: As new standards, regulations, or best practices emerge in a given domain, the domain-specific agents can be easily updated by fine-tuning or enhancing them with the latest knowledge and datasets, ensuring they remain up-to-date and effective.

To implement this embodiment, the APRM includes an agent management system that allows for the easy integration, configuration, and deployment of domain-specific agents built upon pre-trained TBM-CUs or enhanced using RAG techniques. The system provides interfaces for fine-tuning or enhancing the agents with domain-specific datasets and knowledge sources, as well as mechanisms for monitoring their performance and updating their knowledge bases as needed.

By incorporating domain-specific agents built upon pre-trained TBM-CUs or enhanced using RAG techniques, the AI-Enhanced Programming Code Value Assessment System extends its capabilities beyond technical code review and provides a comprehensive, domain-aware review process that ensures code contributions meet the highest standards of quality, compliance, and platform-specific requirements while leveraging the power and efficiency of pre-trained language models.

FIG. 1 illustrates a high-level diagram of an AI-Enhanced Programming Code Value Assessment System 100 in accordance with aspects of the present disclosure. The main components of the system 100 include an Input Module 102, a Processing Unit 104 with a Text-Based Models with Contextual Understanding (TBM-CUs) 104a, an AI Peer Review Module 106, a Communication Module 108, and a Visualization Module 110, along with their interconnections.

Figure 2:
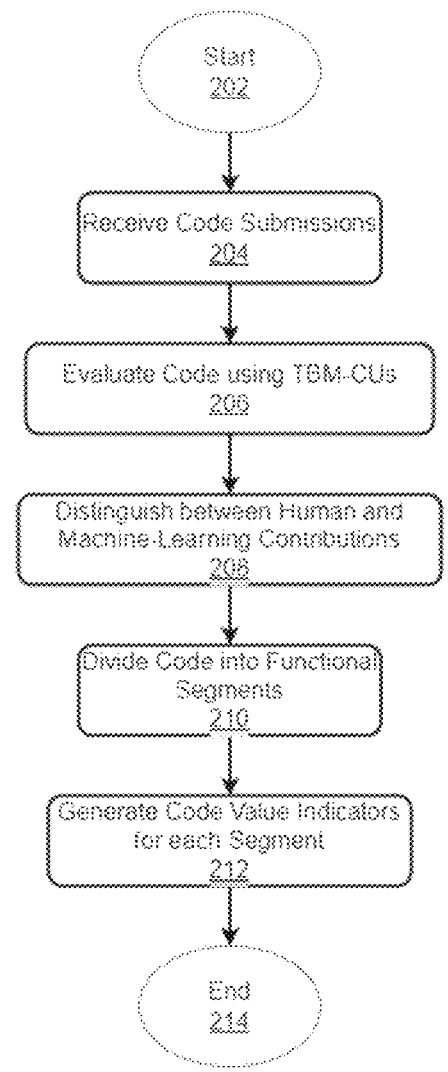
FIG. 2 depicts a flowchart outlining the process for evaluating code submissions using TBM-CUs in accordance with aspects of the present disclosure.

FIG. 2 depicts an exemplary flowchart outlining the process 200 for evaluating code submissions using TBM-CUs 104a in accordance with aspects of the present disclosure. The process 200 begins in step 202 and proceeds to step 204. In step 204, the process 200 receives code submissions. In step 206, the process 200 evaluates the received code submissions using TBM-CUs 104a. In step 208, the process 200 distinguishes between human and machine-learning contributions. In step 210, the process 200 divides the code into Functional Segments. In step 212, process 200 generates Code Value Indicators for each segment, and proceeds to step 214 to end the process.

Figure 3:
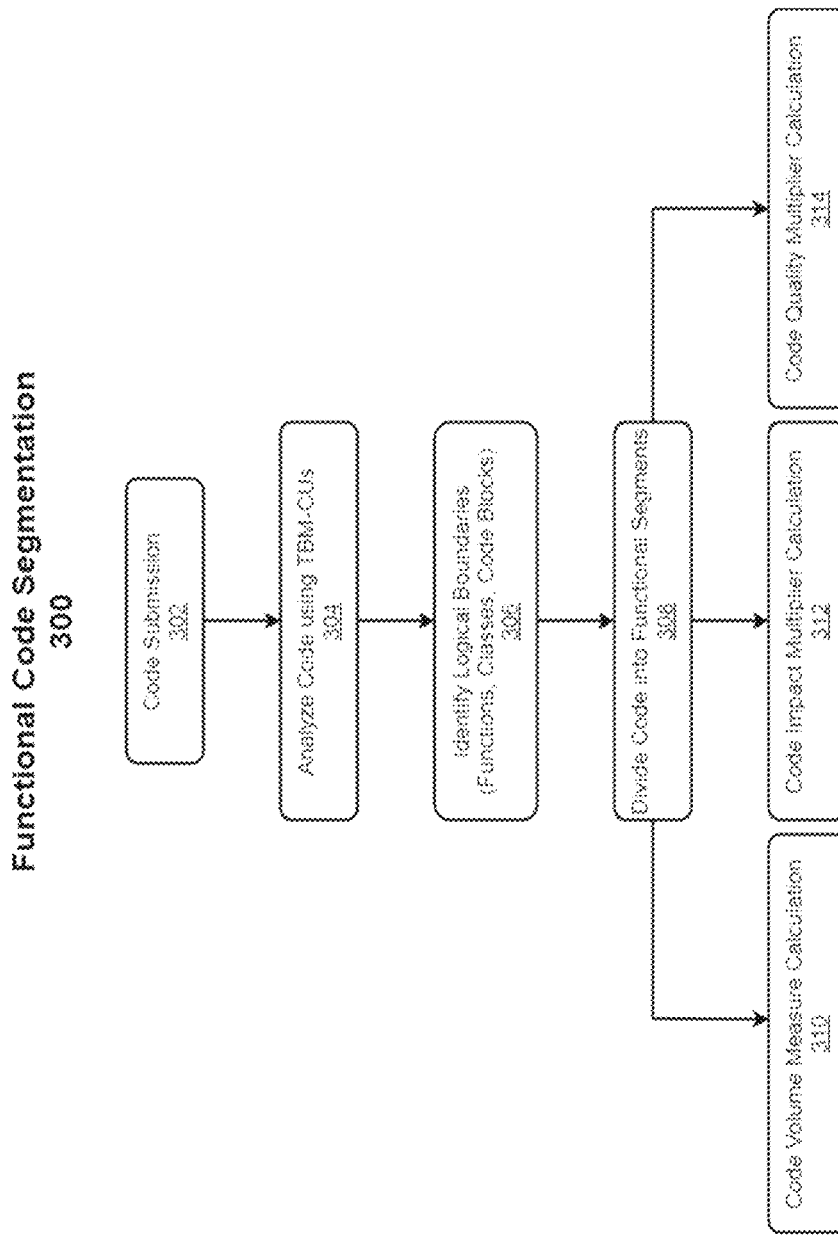
FIG. 3 presents a flowchart that details the process of dividing code submissions into meaningful and coherent Functional Segments in accordance with aspects of the present disclosure.

FIG. 3 presents a flowchart of process 300 for dividing code submissions into meaningful and coherent Functional Segments in accordance with aspects of the present disclosure. In step 302, process 300 receives code submissions. In step 304, process 300 analyzes the received code submissions using TBM-CUs 104a. In step 306, process 300 identifies logical boundaries, such as functions, classes, and code blocks. In step 308, process 300 divides the code into Functional Segments. After the codes have been divided into functional segments, process 300 proceeds to steps 310, 312, and 314 and calculations are performed on the functional segments. The various calculations can be performed in parallel or in series. As shown in FIG. 3, in step 310, calculations of Code Volume Measure are performed. In step 312, Code Impact Multiplier calculation is performed. In step 314, Code Quality Multiplier calculation is performed.

Figure 4:
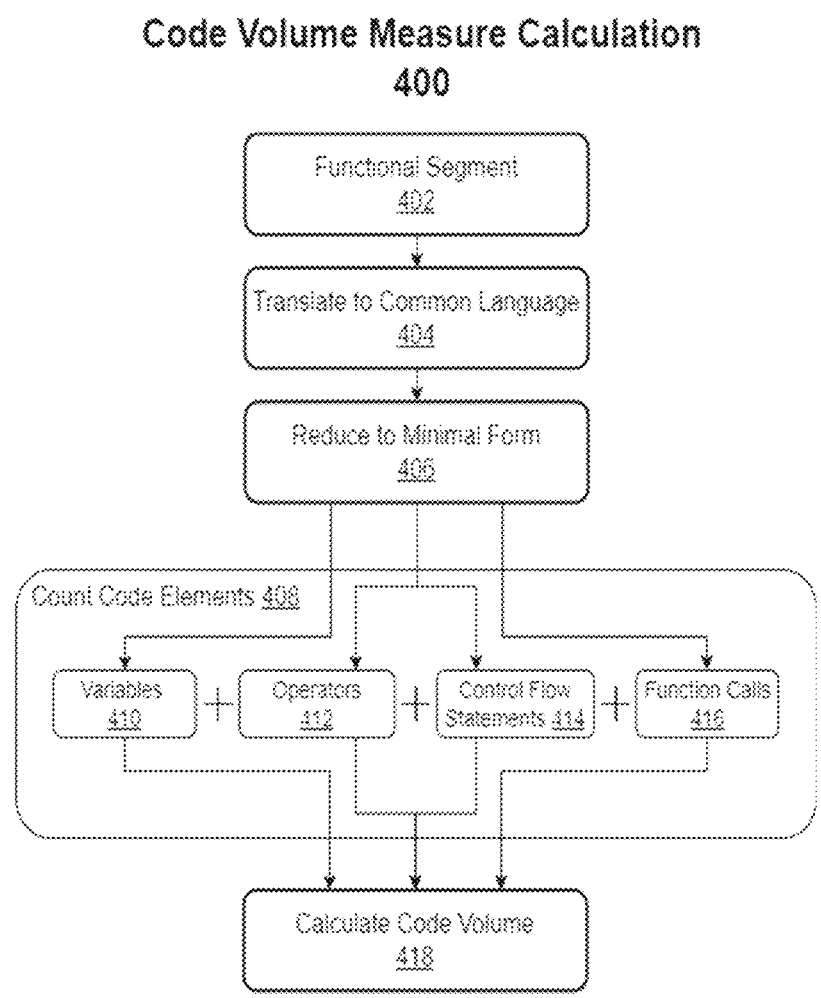
FIG. 4 illustrates the process of measuring the Code Volume of a Functional Segment in accordance with aspects of the present disclosure.

FIG. 4 illustrates the process 400 for measuring the Code Volume of a Functional Segment in accordance with aspects of the present disclosure. In step 402, process 400 receives a functional segment. In step 404, process 400 translates the segment into a common language. In step 406, process 400 reduces the translated segment to its minimal form. In step 408, process 400 counts code key elements. The counting of the code key elements is performed in step 410 for variables, in step 412 for operators, in step 414 for control flow statements, and in step 416 for function calls. As shown in FIG. 4, steps 410, 412, 414 and 416 can be performed in parallel or in series. In step 418, process 400 calculates the overall code volume. Thus, the results of steps 410, 412, 414 and 416 are used in calculating the overall code volume.

Figure 5:
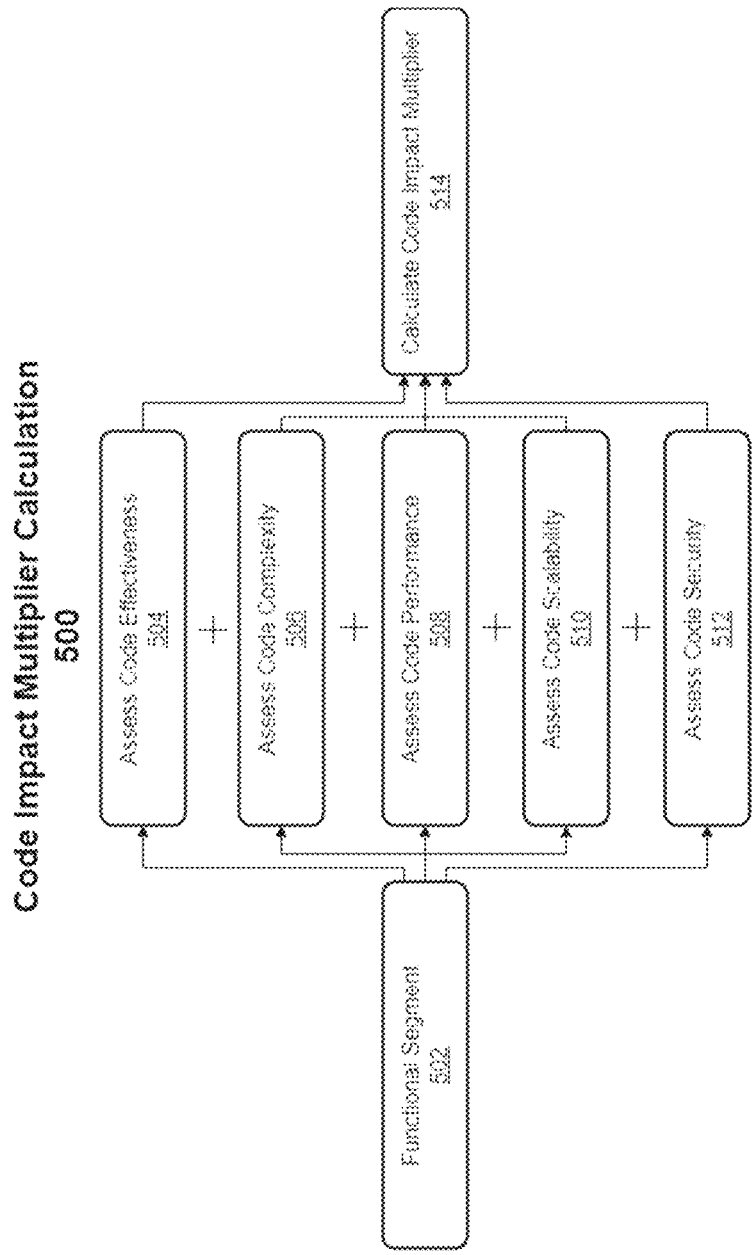
FIG. 5 depicts a drawing illustrating the calculation of the Code Impact Multiplier in accordance with aspects of the present disclosure.

FIG. 5 depicts the process 500 for calculating the Code Impact Multiplier in accordance with aspects of the present disclosure. In step 500, process 500 receives the functional segment. Then, process 500 proceeds to steps 504, 506, 508, 510, and 512 to determine several factors on which the calculation of the Code Impact Multiplier will be based. In step 504, process 500 determines access code effectiveness; in step 506, process 500 determines access code complexity; in step 508, process 500 determines access code performance; in step 510, process 500 determines access code scalability; and in step 512, process 500 determines access code security. In step 514, process 500 calculates the Code Impact Multiplier based on a combined assessment of these factors. The outcomes of step 514 quantifies the influence of a Functional Segment on the overall project.

Figure 6:
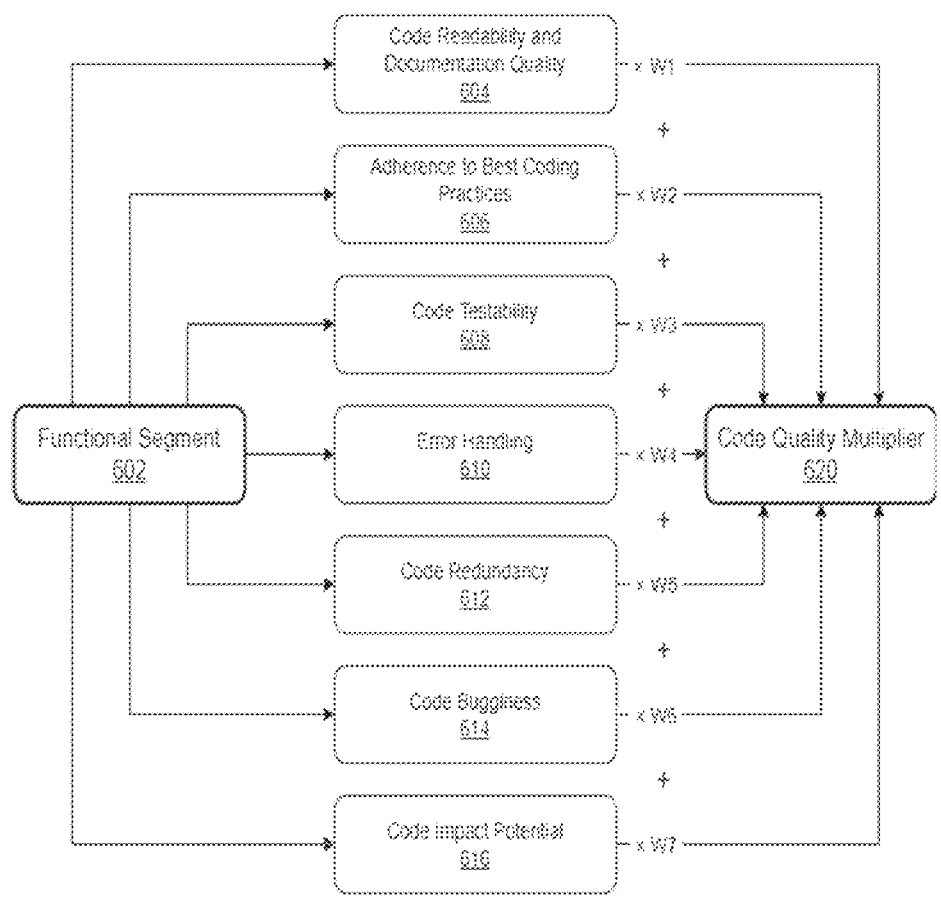
FIG. 6 presents the process of assessing Code Quality by considering various factors to calculate code quality multiplier in accordance with aspects of the present disclosure.

FIG. 6 presents the process 600 of assessing Code Quality by considering various factors to calculate code quality multiplier in accordance with aspects of the present disclosure. In step 602, the process 600 receives functional segments. The process of assessing Code Quality is performed by considering several factors. Thus, the process 600 proceeds to steps 604, 606, 608, 610, 612, 614 and 616 to determine values for the various factors. In step 604, process 600 determines readability and documentation quality; in step 606, process 600 determines adherence to best coding practices; in step 608, process 600 determines testability; in step 610, process 600 determines error handling; in step 612, process 600 determines redundancy; in step 614, process 600 determines bugginess; and in step 616, process 600 determines impact potential. In step 620, process 600 combines these factors to calculate the Code Quality Multiplier.

Figure 7:
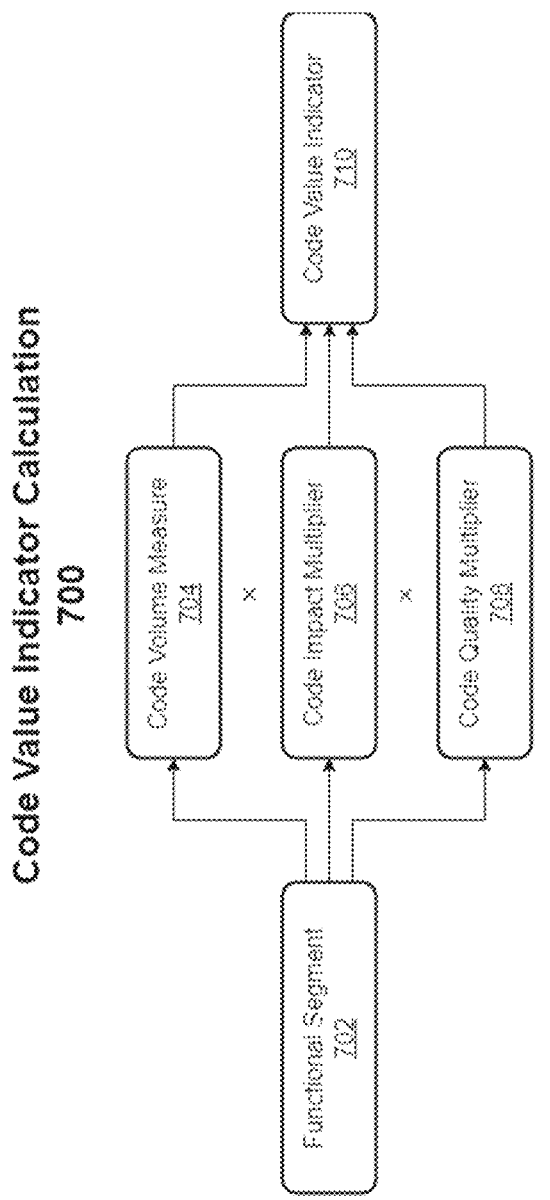
FIG. 7 details the calculation of the Code Value Indicator in accordance with aspects of the present disclosure.

FIG. 7 presents the process 700 for calculating Code Value Indicators in accordance with aspects of the present disclosure. In step 702, the process 700 receives functional segments. The calculation of the Code Value Indicator integrates several factors for a Functional Segment. Thus, the process 700 proceeds to steps 704, 706 and 708 to determine the various factors to be used for determining the code value indicator. In step 704, process 700 determines the Code Volume Measure; in step 706, process 700 determines the Code Impact Multiplier; and in step 708, process 700 determines Code Quality Multiplier. In step 710, process 700 determines the Code Value Indicator. The resulting Code Value Indicator provides a comprehensive measure of the segment's value.

Figure 8:
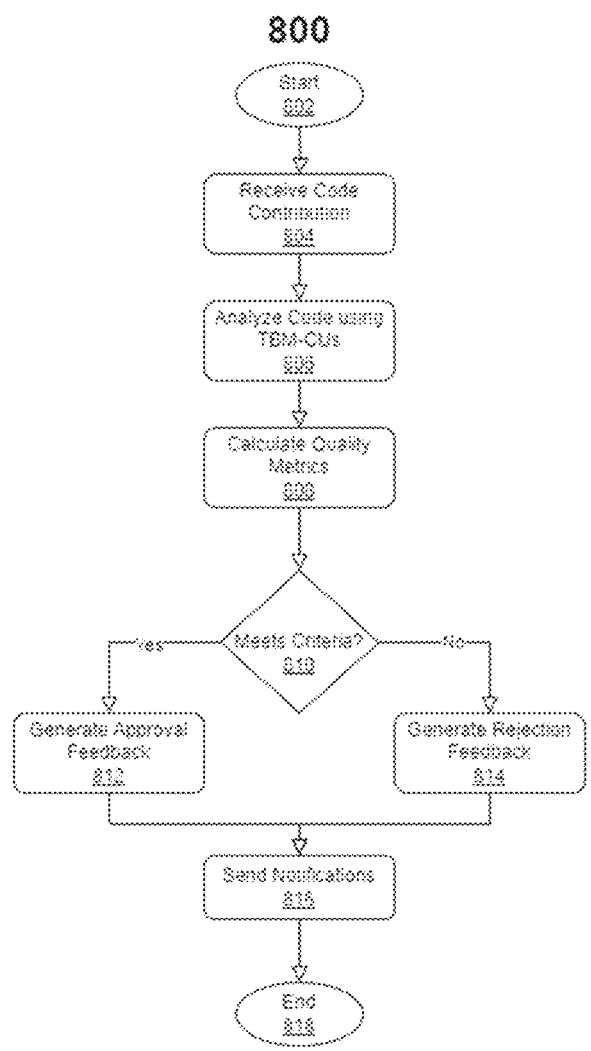
FIG. 8 illustrates the operation of the AI Peer Review Module in accordance with aspects of the present disclosure.

FIG. 8 illustrates a method 800 for operation of the AI Peer Review Module in accordance with aspects of the present disclosure. The method 800 starts in step 802 and proceeds to step 804. In step 804, method 800 receives code contributions. In step 806, method 800 analyzes the code using TBM-CUs. In step 808, method 800 calculates quality metrics. In step 810, method 800 determines whether the code meets the predefined criteria. When the code meets the predefined criteria, the method proceeds to step 812. Otherwise, the method proceeds to step 814. In step 812, method 800 generates approval feedback, and proceeds to step 816. In step 814, method 800 generates rejection feedback, and proceeds to step 816. In step 816, method 800 sends a notification based on either the approval feedback or the rejection feedback, and proceeds to step 818 to end the process.

Figure 9:
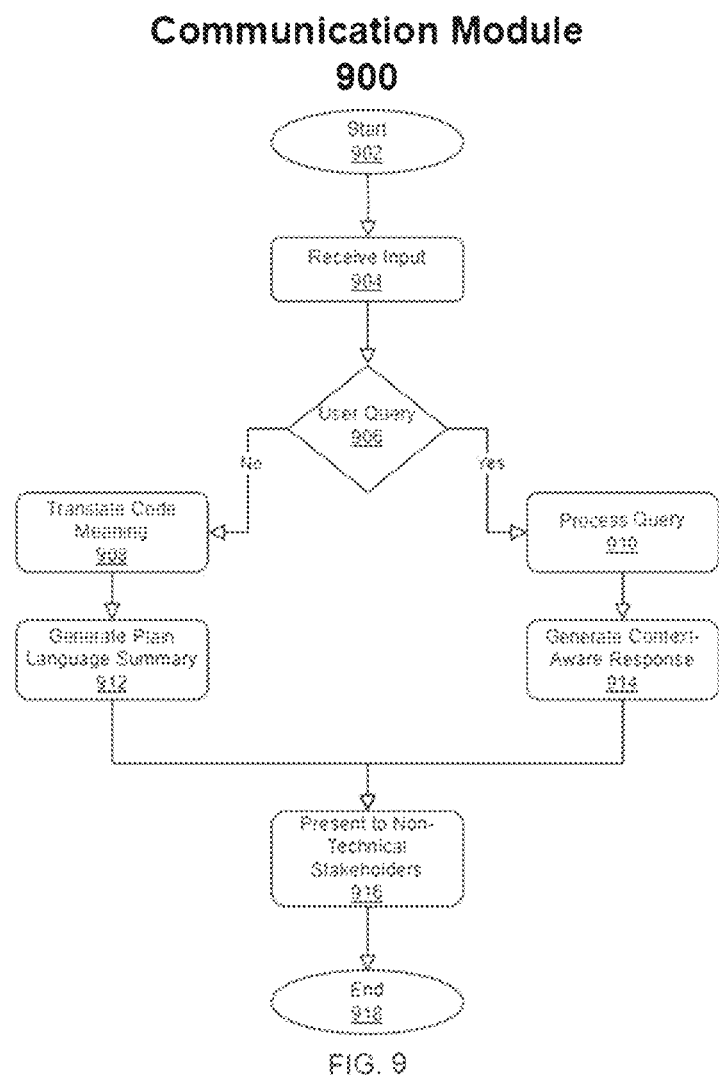
FIG. 9 shows the functionality of the Communication Module in accordance with aspects of the present disclosure.

FIG. 9 shows a method 900 for performing the functions of the Communication Module in accordance with aspects of the present disclosure. Method 900 starts in step 902 and proceeds to step 904. In step 904, method 900 receives an input into the communications module. In step 906, determines whether the received input is a user query. When the received input is not a user query, method 900 proceeds to step 908. Otherwise, method 900 proceeds to step 910. In step 908, method 900 translates the code meaning into plain language and proceeds to step 912 to generate plain language summary based on the output of step 908. In step 910, method 900 processes the user queries, and proceeds to step 914 to generate context-aware responses. Then, method 900 proceeds either from step 912 or 914 to step 916. In step 916, method 900 generates and presents summaries to non-technical stakeholders, and proceeds to step 918 to end the process. Thus, the functionality of the Communication Module shown in FIG. 9 includes how it process user queries to generate context-aware responses. If no query is present, translating the code meaning into plain language, and generating summaries for non-technical stakeholders.

The systems and methods of the present disclosure can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the technology by operating on input data and generating output. Method steps can also be performed by, and an apparatus can be implemented as, special purpose logic circuitry. The circuitry can, for example, be an FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. This includes central processing units (CPUs), graphics processing units (GPUs), tensor processing units (TPUs), and other specialized processors. Generally, a processor receives instructions and data from a read-only memory or a random access memory or both. The essential elements of a computer are a processor for executing instructions and one or more memory devices for storing instructions and data. Generally, a computer can include, and can be operatively coupled to receive data from and/or transfer data to, one or more mass storage devices for storing data (e.g., solid-state drives (SSDs), magnetic disks, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in, special purpose logic circuitry.

To provide for interaction with a user, the above-described techniques can be implemented on a computer having a display device. The display device can, for example, be a liquid crystal display (LCD) monitor, an organic light-emitting diode (OLED) display, or other modern display technologies. The interaction with a user can, for example, be a display of information to the user and a keyboard and a pointing device (e.g., a mouse, a trackpad, or a touchscreen) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. This includes AI inference operations in data centers where models like TBM-CUs are executed on powerful servers and specialized hardware accelerators (e.g., GPUs, TPUs). The above-described techniques can be implemented in a distributed computing system that includes a front-end component. The front-end component can, for example, be a client computer having a graphical user interface, a web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The stem can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Wi-Fi networks (e.g., 802.11ax, 802.11ac), 5G networks), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a smartphone, an IP phone, a mobile device (e.g., cellular phone, tablet, laptop computer, smart watch, electronic mail device), and/or other communication devices. The browser device includes, for example, a computer (e.g., desktop computer, laptop computer) with a world wide web browser (e.g., Google Chrome, Microsoft Edge, Mozilla Firefox). The mobile computing device includes, for example, modem smartphones such as iPhones and Android devices.

Comprise, include, and/or plural forms of each are open-ended and include the listed parts and can include additional parts that are not listed. And/or is open-ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein. Scope of the technology is thus indicated by the appended claims, rather than by the foregoing description, and all changes that come within the meaning and range of equivalency of the claims are therefore intended to be embraced therein.

Figure 10:
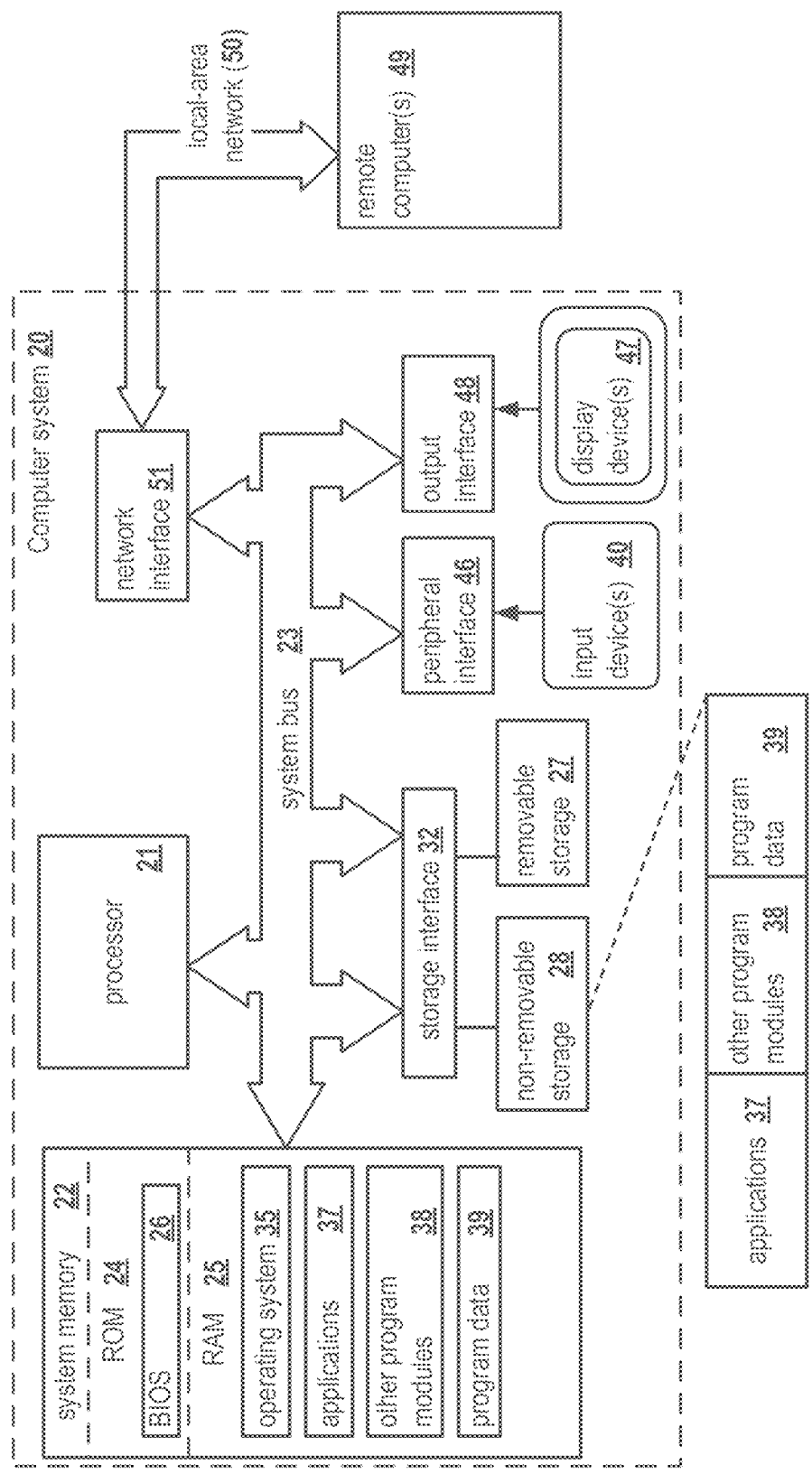
FIG. 10 is a block diagram illustrating various components of an example computer system via which aspects of the present disclosure may be implemented.

FIG. 10 is a block diagram illustrating various components of an example computer system 20 via which aspects of the present disclosure for automating the evaluation of source code and programmer performance may be implemented. The computer system 20 may, for example, be or include a computing system of the user device, or may comprise a separate computing device communicatively coupled to the user device, etc. In addition, the computer system 20 may be in the form of multiple computing devices, or in the form of a single computing device, including, for example, a mobile computing device, a cellular telephone, a smart phone, a desktop computer, a notebook computer, a laptop computer, a tablet computer, a server, a mainframe, an embedded device, and other forms of computing devices.

As shown in FIG. 10, the computer system 20 may include one or more central processing units (CPUs) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, Infini-Band™, Serial ATA, I²C, and other suitable interconnects. The central processing unit 21 (also referred to as a processor) may include a single or multiple sets of processors having single or multiple cores. The processor 21 may execute one or more computer-executable lines of code implementing techniques in accordance with aspects of the present disclosure. The system memory 22 may be or include any memory for storing data used herein and/or computer programs that are executable via the processor 21. The system memory 22 may include volatile memory, such as a random access memory (RAM) 25 and non-volatile memory, such as a read only memory (ROM) 24, flash memory, etc., or any combination thereof. The basic input/output system (BIOS) 26 may store the basic procedures for transfer of information among elements of the computer system 20, such as those at the time of loading the operating system with the use of the ROM 24.

The computer system 20 may include one or more storage devices, such as one or more removable storage devices 27, one or more non-removable storage devices 28, or a combination thereof. The one or more removable storage devices 27 and non-removable storage devices 28 may be coupled to the system bus 23 via a storage interface 32. In an aspect, the storage devices and the corresponding computer-readable storage media may be or include power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory, such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology, such as in solid state drives (SSDs) or flash drives; magnetic cassettes, magnetic tape, and magnetic disk storage, such as in hard disk drives or floppy disks; optical storage, such as in compact disks (CD-ROM) or digital versatile disks (DVDs); and any other medium that may be used to store the desired data and that may be accessed via the computer system 20.

The system memory 22, removable storage devices 27, and/or non-removable storage devices 28 of the computer system 20 may be used to store an operating system 35, additional program applications 37, other program modules 38, and/or program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47, such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

Figure 11:
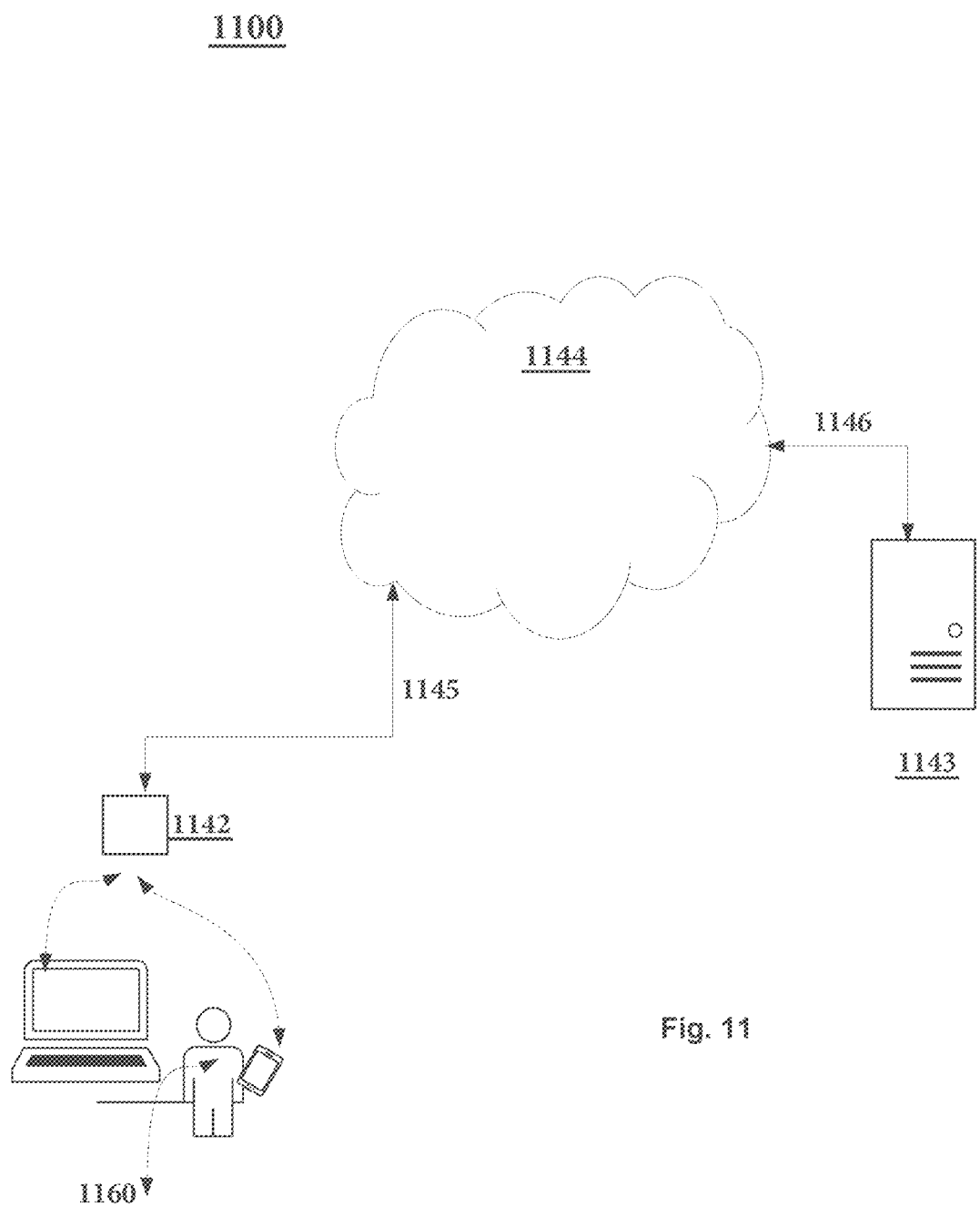
FIG. 11 is a block diagram of various example system components, usable in accordance with aspects of the present disclosure.

The computer system 20 may operate in a network environment as shown in FIG. 11, using a network connection to one or more remote computers 49. The remote computer (or computers) 49 may be or include local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks, such as a local-area computer network (LAN) 50, a wide-area computer network (WAN), an intranet, and the Internet. Examples of the network interface 51 may include an Ethernet interface, a Frame Relay interface, SONET interface, and wireless interfaces.

FIG. 11 is a block diagram of various example system components, usable in accordance with aspects of the present disclosure. FIG. 11 shows a communication system 1100 usable in accordance with aspects of the present disclosure. The communication system 1100 includes one or more accessors 1160 (also referred to interchangeably herein as one or more "users") and one or more terminals 1142. In one aspect, data for use in accordance with aspects of the present disclosure may, for example, be input and/or accessed by accessors 1160 via terminals 1142, such as personal computers (PCs), minicomputers, mainframe computers, microcomputers, telephonic devices, or wireless devices, such as personal digital assistants ("PDAs"), smart phones, or other hand-held wireless devices coupled to a server 1143, such as a PC, minicomputer, mainframe computer, microcomputer, or other device having a processor and a repository for data and/or connection to a repository for data, via, for example, a network 1144, such as the Internet or an intranet, and couplings 1145, 1146. In one aspect, various features of the method may be performed in accordance with a command received from another device via a coupling 1145, 1146. The couplings 1145, 1146 may include, for example, wired, wireless, or fiberoptic links. In another variation, various features of the method and system in accordance with aspects of the present disclosure may operate in a stand-alone environment, such as on a single terminal. In one aspect, the server 1143 may be a remote computer 49, as shown in FIG. 10, or a local server.

Aspects of the present disclosure may be or include a system, a method, and/or a computer program product. The computer program product may include a computer readable storage medium (or media) having computer readable program instructions thereon for causing a processor to carry out aspects of the present disclosure.

The computer readable storage medium may be or include a tangible device that may retain and store program code in the form of instructions or data structures that may be accessed via a processor of a computing device, such as the computing system 20. The computer readable storage medium may be or include an electronic storage device, a magnetic storage device, an optical storage device, an electromagnetic storage device, a semiconductor storage device, or any suitable combination thereof. By way of example, such computer-readable storage medium may comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device, such as punch-cards or raised structures in a groove having instructions recorded thereon. As used herein, a computer readable storage medium is not to be construed as being or only being transitory signals per se, such as radio waves or other freely propagating electromagnetic waves, electromagnetic waves propagating through a waveguide or transmission media, or electrical signals transmitted through a wire.

Computer readable program instructions described herein may be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations in accordance with aspects of the present disclosure may be or include assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be coupled to the user's computer via any suitable type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform various functions in accordance with aspects of the present disclosure.

In various aspects, the systems and methods described in the present disclosure may be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 10, above). Accordingly, each module may be realized in a variety of suitable configurations, and should not be limited to any particular implementation shown or described as an example herein.

In the interest of clarity, not all of the routine features of the aspects are disclosed herein. It will be appreciated that in the development of any actual implementation of features in accordance with aspects of the present disclosure, numerous implementation-specific decisions may be made in order to achieve the developer's specific goals, and these specific goals may vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of various features in accordance with aspects of the present specification are to be interpreted by one of ordinary skill in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it will be apparent to those skilled in the art having the benefit of this disclosure that many more modifications than mentioned above are possible without departing from the innovative concepts disclosed herein.

What is claimed is:

1. A computer-implemented system for programming code value quantification, the system comprising:
   an input processing subsystem configured to receive program code submissions from one or more developers and preprocess the submissions by normalizing code syntax across programming languages and styles for semantic analysis;

a processing unit implementing transformer-based Text-Based Models with Contextual Understanding (TBM-CUs) executed on one or more parallel-computing hardware accelerators including graphics processing units (GPUs) or tensor processing units (TPUs) or Neural Processing Units (NPUs), the processing unit configured to:

transform the pre-processed code submissions into contextual embeddings by tokenizing the submissions into variable-length sequences of code elements and generating semantic representations using multi-head attention layers accelerated by the parallel-computing hardware accelerators, wherein the contextual embeddings encode syntactic dependencies and semantic relationships specific to the code submissions' functional intent; and process the contextual embeddings using the transformer-based TBM-CUs to evaluate the functional meaning, purpose, and value of the submitted code segments and generate a quantification metric reflective of at least one of the code's volume, functional contribution, or quality, the quantification metric derived by applying multi-head attention-based analysis to the contextual embeddings and stored in a memory of the system as a numerical or categorical machine-derived metric.

2. The system of claim 1, wherein the transformer-based TBM-CUs are configured to:

tokenize the pre-processed code submissions into variable-length sequences of code elements at one or more granularity levels selected from the group consisting of character-level, subword-level, word-level, and phrase-level;

generate contextual embeddings from the tokenized sequences using multi-head attention layers accelerated by the parallel-computing hardware accelerators, the contextual embeddings encoding semantic and syntactic relationships by:

processing the sequences sequentially to capture dependencies and propagate contextual information across variable-length inputs; and applying mathematical operations, including matrix multiplications and non-linear transformations, to compute attention-based relevance scores for different parts of the input; and adapt to programming code domains by learning domain-specific patterns, structures, and semantics from relevant datasets to enable accurate quantification of the code submissions.

3. The system of claim 1, wherein the processing unit is configured to generate the quantification metric by:

dividing the pre-processed code submissions into a plurality of Functional Segments using the transformer-based TBM-CUs executed on parallel-computing hardware accelerators including graphics processing units (GPUs) or tensor processing units (TPUs) or Neural Processing Units (NPUs), wherein the TBM-CUs segment the code by analyzing the contextual embeddings to identify semantically coherent units of functional intent, the segmentation achieved by:

applying multi-head attention mechanisms to the contextual embeddings to detect boundaries where syntactic dependencies and semantic relationships indicate distinct functional purposes, such as data processing, control flow, or error handling, across variable-length code sequences; and grouping the tokenized code elements into Functional Segments based on attention-weighted patterns that reflect their contribution to the overall program's functionality, rather than solely syntactic structure;

determining, for each Functional Segment, using the transformer-based TBM-CUs:

a Code Volume Measure that quantifies the amount of code within the segment;

a Code Impact Multiplier that represents the segment's influence on the overall project;

a Code Quality Multiplier that reflects adherence to established programming best practices; and a Code Value Indicator by combining the Code Volume Measure, Code Impact Multiplier, and Code Quality Multiplier;

aggregating the Code Value Indicators of all Functional Segments to produce the numerical or categorical quantification metric stored in the memory of the system.

4. The system of claim 3, wherein the processing unit determines the Code Volume Measure for each Functional Segment using the transformer-based TBM-CUs by:

transforming the Functional Segment's contextual embeddings into a normalized semantic representation that abstracts language-specific syntax, leveraging multi-head attention to identify functionally equivalent code elements across programming styles;

reducing the normalized semantic representation to a minimal form by filtering redundant or stylistically variable elements based on attention-weighted semantic patterns; and measuring the volume of the minimal form as a count of essential functional elements, including variables, logical operators, control flow statements, and function calls, derived from the contextual embeddings.

5. The system of claim 3, wherein the processing unit determines the Code Impact Multiplier for each Functional Segment using the transformer-based TBM-CUs by analyzing the contextual embeddings to assess the segment's influence on the overall project, based on factors including:

Code Effectiveness, quantified by semantic alignment with project goals identified via attention-weighted functional patterns;

Code Complexity, measured by the depth of syntactic dependencies encoded in the embeddings;

Code Performance, evaluated through execution efficiency inferred from semantic context;

Code Scalability, assessed by adaptability patterns detected across the segment; and Code Security, determined by the presence of vulnerability-related semantic markers:

wherein the multi-head attention layers assign weights to these factors to compute the Code Impact Multiplier.

6. The system of claim 3, wherein the processing unit determines the Code Quality Multiplier for each Functional Segment using the transformer-based TBM-CUs by analyzing the contextual embeddings to evaluate adherence to programming best practices, based on factors including:

Code Readability and Documentation Quality, assessed by semantic coherence of embedded comments and code structure;

Adherence to Best Coding Practices, measured against domain-specific norms encoded in the embeddings;

Code Testability, inferred from modularity and dependency patterns;

Error Handling, evaluated by exception-handling semantic markers;
Code Redundancy, detected via repeated embedding patterns;
Code Bugginess, assessed by similarity to defect-related semantic signatures; and
Code Impact Potential, weighted by influence on critical project functions:
wherein the multi-head attention layers assign weights to these factors to compute the Code Quality Multiplier.

7. The system of claim 3, wherein the processing unit is further configured to generate the Code Value Indicator for each Functional Segment by combining the Code Volume Measure, Code Impact Multiplier, and Code Quality Multiplier using the transformer-based TBM-CUs, wherein the combination method is adaptable to project-specific requirements, such as a weighted sum or multiplication.

8. The system of claim 7, wherein the Code Value Indicator is calculated by multiplying the Code Volume Measure, Code Impact Multiplier, and Code Quality Multiplier as a default combination method executed by the transformer-based TBM-CUs, producing a quantified value for each Functional Segment.

9. The system of claim 7, wherein the Code Value Indicator provides a numerical representation of each Functional Segment's quantified value, enabling automated comparisons between Functional Segments and tracking of productivity trends over time using the quantification metric stored in the memory of the system.

10. The system of claim 1, wherein the Processing Unit is further configured to:
calculate an AI Tools Adoption Score for each developer using the transformer-based TBM-CUs, the score quantifying the extent of AI-assisted tool usage in documentation generation and code development by analyzing the contextual embeddings for AI-generated patterns.

11. The system of claim 4, wherein the processing unit calculates an AI Tools Adoption Score for each developer using the transformer-based TBM-CUs, the score quantifying the extent of AI-assisted tool usage in documentation generation and code development by analyzing the contextual embeddings for AI-generated patterns for a human developer using the transformer-based TBM-CUs, the calculation being based on the Code Volume Measure, and averaging:
an AI Documentation Generation Adoption sub-score, determined by a ratio of AI-generated comment characters to total comment characters identified in the contextual embeddings; and
an AI Code Generation Adoption sub-score, determined by the ratio of the AI-generated Code Volume Measure to the total Code Volume Measure derived from the contextual embeddings;
wherein the TBM-CUs detect AI-generated elements by analyzing semantic and syntactic signatures in the embeddings.

12. The system of claim 11, wherein the AI Tools Adoption Score for a fully autonomous AI developer is assigned a maximum value by the processing unit using the transformer-based TBM-CUs, differentiating its performance from human developers based on the absence of human-specific syntactic variations in the contextual embeddings.

13. The system of claim 1, further comprising an artificial intelligence (AI) review subsystem configured to automatically review, accept, or reject the code submissions based on the quantification metric using predefined thresholds, wherein the AI review subsystem is further configured to:
deploy a configurable set of domain-specific agents or modules, each incorporating knowledge and expertise from relevant domains, industries, or platforms using advanced natural language processing techniques and machine learning models;
customize the domain-specific agents by training or enhancing them with relevant datasets, industry guidelines, and platform documentation to acquire specialized knowledge and expertise;
dynamically select and apply the relevant domain-specific agents based on the project's and the specific files or modules being reviewed, working in conjunction with the general code review capabilities of the AI review subsystem;
ensure compliance with industry-specific requirements and project specifications;
generate automated notifications based on predefined criteria; and
produce automated documentation for certification and compliance purposes.

14. The system of claim 13, wherein the AI review subsystem is configured to generate automated notifications using the transformer-based TBM-CUs by analyzing the quantification metric and contextual embeddings, the notifications triggered when:
the code complexity, measured by syntactic dependency depth in the embeddings, exceeds a predefined threshold;
critical issues, identified by high-impact semantic markers, indicate a significant risk to project functionality;
developer performance, assessed via historical quantification metric trends, falls below a statistically determined baseline;
recurring bugs are detected in the same Functional Segments through pattern similarity in the embeddings; or
potential malicious code patterns are identified by anomaly detection in the semantic representations.

15. The system of claim 1, further comprising a communication subsystem configured to translate the quantification metric and associated code segment functionality into plain-language summaries for non-technical stakeholders, wherein the communication subsystem comprises an interactive interface that employs Text-Based Models with Contextual Understanding (TBM-CUs) to process inquiries from non-technical stakeholders, said TBM-CUs configured to:
tokenize the inquiries to break them down into discrete units of meaning;
perform syntactic parsing to analyze the grammatical structure of the inquiries;
conduct semantic analysis to discern the contextual meaning and intent behind the inquiries;
generate responses that are contextually relevant and semantically appropriate to the inquiries by leveraging the TBM-CUs' natural language generation capabilities; and
tailor the generated responses to the specific needs and knowledge level of the non-technical stakeholders, ensuring effective and understandable communication.

16. The system of claim 1, further comprising a visualization subsystem configured to present the quantification metric over various time periods and dimensions to provide insights into trends, patterns, and comparative performance of the code segments, wherein the visualization subsystem is further configured to:

provide comprehensive dashboards and detail-oriented views for technical users;
generate simplified summaries for business users; and
offer trend analysis, comparative views, and customizable reporting features.

17. The system of claim 1, wherein the processing unit is further configured to:
perform temporal analysis of the code submissions by:
evaluating the historical and future context of code changes;
assessing the evolution of the code and identifying patterns; and
predicting potential impacts of current changes on the project;
distinguish code contributions from human programmers or machine learning systems to quantify their respective efficiencies by:
analyzing patterns and markers in the contextual embeddings using the transformer-based TBM-CUs, wherein the multi-head attention layers identify authorship-specific semantic signatures by:
processing token sequences of the pre-processed code submissions alongside metadata, such as developer identifiers or generation tool markers, to generate authorship-augmented contextual embeddings that encode syntactic patterns and semantic structures indicative of human-authored code versus machine-generated code;
applying self-attention mechanisms across the authorship-augmented contextual embeddings to detect distinguishing features, including repetitive syntactic constructs typical of machine learning systems or discretionary stylistic variations characteristic of human programmers; and
classifying each code segment's origin by mapping the authorship-augmented contextual embeddings to a trained semantic space, wherein the TBM-CUs are fine-tuned on a corpus of labelled human and machine-generated code to recognize authorship-specific patterns such as algorithmic efficiency markers or documentation density; and
outputting a machine-derived attribution metric stored in the memory of the system, the attribution metric quantifying the contribution proportion and efficiency impact of human versus machine-generated code segments within the program code submissions over time.

18. A computer-implemented method for programming code value quantification comprising:
receiving program code submissions from one or more developers via an input processing subsystem that preprocesses the submissions by normalizing code syntax across programming languages and styles for semantic analysis;
transforming the pre-processed code submissions into contextual embeddings using transformer-based Text-Based Models with Contextual Understanding (TBM-CUs) executed on one or more parallel-computing hardware accelerators including graphics processing units (GPUs) or tensor processing units (TPUs) or Neural Processing Units (NPUs), by tokenizing the submissions into variable-length sequences of code elements and generating semantic representations with multi-head attention layers, wherein the contextual embeddings encode syntactic dependencies and semantic relationships specific to the code submissions' functional intent; and
processing the contextual embeddings with the transformer-based TBM-CUs to evaluate the functional meaning, purpose, and value of the submitted code segments and generate a quantification metric reflective of at least one of the code's volume, functional contribution, or quality, the quantification metric derived by applying multi-head attention-based analysis to the contextual embeddings and stored in a system memory as a numerical or categorical machine-derived metric for automated code evaluation.

19. The method of claim 18, wherein processing the contextual embeddings to generate the quantification metric comprises:
dividing the pre-processed code submissions into a plurality of Functional Segments using the transformer-based TBM-CUs executed on one or more parallel-computing hardware accelerators including graphics processing units (GPUs) or tensor processing units (TPUs) or Neural Processing Units (NPUs), wherein the TBM-CUs segment the code by analyzing the contextual embeddings to identify semantically coherent units of functional intent, the segmentation achieved by:
applying multi-head attention mechanisms to the contextual embeddings to detect boundaries where syntactic dependencies and semantic relationships indicate distinct functional purposes, such as data processing, control flow, or error handling, across variable-length code sequences; and
grouping the tokenized code elements into Functional Segments based on attention-weighted patterns that reflect their contribution to the overall program's functionality, rather than solely syntactic structure;
determining, for each Functional Segment, using the transformer-based TBM-CUs:
a Code Volume Measure that quantifies the amount of code within the segment;
a Code Impact Multiplier that represents the segment's influence on the overall project; and
a Code Quality Multiplier that reflects adherence to established programming best practices; and
aggregating the Code Value Indicators of all Functional Segments to produce the quantification metric stored in the system memory.

20. A computer-implemented method for objective value and productivity quantification of independent developers and outsourcing companies, comprising:
receiving code submissions from independent developers or outsourcing companies via an input processing subsystem that preprocesses the submissions by normalizing code syntax across programming languages and styles for semantic analysis;
transforming the pre-processed code submissions into contextual embeddings using transformer-based Text-Based Models with Contextual Understanding (TBM-CUs) executed on one or more parallel-computing hardware accelerators including graphics processing units (GPUs) or tensor processing units (TPUs) or Neural Processing Units (NPUs), by tokenizing the submissions into variable-length sequences of code elements and generating semantic representations with multi-head attention layers;
processing the contextual embeddings with the transformer-based TBM-CUs to generate a quantification metric reflective of at least one of the code's volume, functional contribution, or quality, the quantification metric stored in a system memory as a machine-derived metric;

generating a comprehensive assessment report including the quantification metric and comparative analysis against industry benchmarks, the report quantifying code quality, productivity, and overall value; and providing the assessment report to the independent developers or outsourcing companies for use in marketing and justifying rates to potential clients.

* * * * *